(12) United States Patent
Niu

(10) Patent No.: US 12,282,697 B2
(45) Date of Patent: Apr. 22, 2025

(54) ELECTRONIC DEVICE, INTER-DEVICE SCREEN COORDINATION METHOD, AND MEDIUM

(71) Applicant: Honor Device Co., Ltd., Shenzhen (CN)

(72) Inventor: Qingjian Niu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 96 days.

(21) Appl. No.: 18/001,380

(22) PCT Filed: Oct. 9, 2021

(86) PCT No.: PCT/CN2021/122792
§ 371 (c)(1),
(2) Date: Dec. 9, 2022

(87) PCT Pub. No.: WO2022/100326
PCT Pub. Date: May 19, 2022

(65) Prior Publication Data
US 2023/0229375 A1   Jul. 20, 2023

(30) Foreign Application Priority Data
Nov. 16, 2020   (CN) .......................... 202011279269.X

(51) Int. Cl.
*G09G 5/02* (2006.01)
*G06F 3/14* (2006.01)
(52) U.S. Cl.
CPC ................. *G06F 3/1423* (2013.01)

(58) Field of Classification Search
CPC .... G09G 5/02; G09G 5/06; G09G 2320/0666; G09G 2340/06; G09G 3/20;
(Continued)

(56) References Cited

U.S. PATENT DOCUMENTS 8,966,366 B2    2/2015 Alfred
2002/0067433 A1*  6/2002 Yui ..................... H04N 21/4622
348/E5.103
(Continued)

FOREIGN PATENT DOCUMENTS

CN      101582053 A    11/2009
CN      103019499 A    4/2013
(Continued)

*Primary Examiner* — Gordon G Liu
(74) *Attorney, Agent, or Firm* — Slater Matsil, LLP

(57) ABSTRACT

This application relates to an electronic device and an inter-device screen coordination method. The method includes: A first electronic device in a screen coordination system displays a first interface that includes first content and has a first display parameter; and when projecting the first interface to a second electronic device in the screen coordination system, the first electronic device modifies a display parameter of the first interface to be the same as a display parameter of a second interface displayed on the second electronic device, so that content display styles of the two electronic devices that are cooperatively displayed on the second electronic device are consistent. According to the method in this application, content of the first electronic device that is cooperatively displayed by the second electronic device is consistent with a content display style of the second electronic device.

20 Claims, 26 Drawing Sheets

(58) Field of Classification Search
CPC ..... G09G 2320/0626; G09G 2360/144; G09G 2360/16; G09G 5/006; G09G 2320/0276; G09G 2320/066; G09G 2370/042; G09G 2370/12; G09T 11/001; G06F 2200/1614; G06F 2200/1637; G06F 3/1454; G06F 3/1432; G06T 11/001; G06T 11/20; G06T 11/40; G06T 11/60; G06T 11/00
USPC .......................................................... 345/589
See application file for complete search history.

(56) References Cited

U.S. PATENT DOCUMENTS

| | | |
|---|---|---|
| 2006/0100011 A1 | 5/2006 | James et al. |
| 2009/0284476 A1 | 11/2009 | William |
| 2013/0073958 A1 | 3/2013 | Tom |
| 2016/0148521 A1 | 5/2016 | Mohammad et al. |
| 2019/0121595 A1* | 4/2019 | Anderson ............... G06F 21/44 |
| 2022/0326825 A1 | 10/2022 | Siyue |
| 2022/0391161 A1 | 12/2022 | Fan et al. |
| 2022/0398059 A1* | 12/2022 | Zhu ....................... G06F 3/0482 |

FOREIGN PATENT DOCUMENTS

| | | | |
|---|---|---|---|
| CN | 104640239 A | 5/2015 | |
| CN | 107145319 A | 9/2017 | |
| CN | 108170472 A | 6/2018 | |
| CN | 110381195 A | 10/2019 | |
| CN | 111158543 A | 5/2020 | |
| CN | 111432070 A | 7/2020 | |
| CN | 111459374 A | 7/2020 | |
| CN | 111736692 A | 10/2020 | |
| CN | 111796749 A | 10/2020 | |
| WO | WO-2021129253 A1 * | 7/2021 | ........... G06F 3/0481 |

* cited by examiner

ELECTRONIC DEVICE, INTER-DEVICE SCREEN COORDINATION METHOD, AND MEDIUM

CROSS-REFERENCE TO RELATED APPLICATIONS

This application is a national stage of International Application No. PCT/CN2021/122792, filed on Oct. 9, 2021, which claims priority to Chinese Patent Application No. 202011279269.X, filed on Nov. 16, 2020. The disclosures of both of the aforementioned application are hereby incorporated by reference in their entireties.

TECHNICAL FIELD

This application relates to the field of terminal technologies, and in particular, to an electronic device, an inter-device screen coordination method, and a medium.

BACKGROUND

With development of communication technologies between electronic devices, a user may more conveniently project an interface on the electronic device to another electronic device. Display styles such as a font size, a font style, a background pattern, a background color, and a control attribute between various electronic devices may be different. When an interface of an electronic device is projected to another electronic device that has a different style, display style incoordination exists.

For example, as shown in (a) and (b) in FIG. 1A, when multi-screen coordination display is performed between a mobile phone 100 and a tablet computer 200, a user may start a multi-screen coordination display function of the mobile phone 100 by tapping a multi-screen coordination key in a drop-down menu of the mobile phone 100. As shown in (c) in FIG. 1A, after the user determines that a coordination object is the tablet computer 200, the mobile phone 100 communicates with the tablet computer 200 by using a wireless communication function. As shown in (d) in FIG. 1B, a display interface 202 of the tablet computer 200 mirrors a display interface 103 of the mobile phone 100, which is similar to projecting a window of the mobile phone 100 to the display interface 202 of the tablet computer 200. It may be learned from (d) in FIG. 1B that a font style of the tablet computer 200 is Song typeface and a background color is white, while a font style of a character in the current display interface 103 of the mobile phone 100 is regular script, and a "ripple" background pattern (for example, a background color is pink or blue, and a ripple is on the background pattern) is used. Therefore, after the display interface 103 of the mobile phone 100 is projected on the display interface 202 of the tablet computer 200, there is a problem of style incoordination with the display interface 202 of the tablet computer 200.

SUMMARY

This application aims to provide an electronic device, an inter-device screen coordination method, and a medium. According to the method in this application, the electronic device modifies a display style of to-be-projected display content according to a display style of a to-be-projected device, and then performs screen projection, so that the display style of to-be-projected display content is consistent with the display style of the to-be-projected device for coordination display A first aspect of this application provides an inter-device screen coordination method, applied to a screen coordination system including a first electronic device and a second electronic device, where the method includes: establishing, by the first electronic device, a multi-screen coordination connection to the second electronic device; displaying, by the first electronic device, a first interface, where the first interface includes first content, and the first interface has a first display parameter; displaying, by the second electronic device, a second interface, where the second interface includes second content, and the second interface has a second display parameter; sending, by the first electronic device, a third interface to the second electronic device; and in response to the received third interface, displaying, by the second electronic device, a fourth interface, where the fourth interface includes the second content and a first window, the first window includes the first content, and the first content in the first window has the second display parameter.

That is, in this embodiment of this application, when the first electronic device projects the first interface to the second electronic device for coordination display, the third interface whose display content is the same as that of the first interface but whose display parameter is the same as that of the second interface of the second electronic device is generated, so that when the second electronic device simultaneously displays the second content of the second electronic device and the first content (in the first window) projected by the first electronic device on the fourth interface, display styles of the two are consistent.

For example, the first electronic device may be a mobile phone, and the second electronic device may be a smartwatch. The first interface herein may be a display interface of the mobile phone. The display interface includes a contact icon, a contact name, and the like, that is, the first content. In addition, a font of a character in the display interface of the mobile phone is regular script, and a background color is pink, that is, the first display parameter. The second interface herein may be a display interface of the smartwatch, and the display interface includes: date, time, and the like, that is, the second content. In addition, a font of a character in the display interface of the smartwatch is STCaiyun, and a background color is white, that is, the second display parameter. Herein, the third interface may be a projection interface that is generated by the mobile phone for screen projection to the second electronic device. The mobile phone modifies the font style in the third interface from regular script to STCaiyun and modifies the background color to white, that is, modifies them to the second display parameter, and then projects the third interface to the display interface of the smartwatch. The fourth interface herein may be a display interface of the smartwatch, and the first window is a local screen projection region in the display interface of the smartwatch. After the smartwatch receives the third interface of the mobile phone, in addition to displaying date, time, and the like in the display interface, the smartwatch further displays the third interface, that is, a contact icon, a contact name, reminder content, a cancel key, a switch to voice key, and the like, in the local screen projection region, that is, the first content. In addition, a font of a character in the first content is STCaiyun, and a background color is white, that is, the second display parameter.

In a possible implementation of the first aspect, a display parameter includes at least one of a font style, a font size, a font color, an icon color, an icon size, a background color, a background pattern, and a control attribute; and the display parameter includes the first display parameter and the second display parameter.

In a possible implementation of the first aspect, the second display parameter includes a display style identifier, the display style identifier is corresponding to a display style of the second interface, and corresponding to different display style identifiers, at least one of a font style, a font size, a font color, an icon color, an icon size, a background color, a background pattern, and a control attribute of the second interface of the second electronic device is different.

That is, in this embodiment of this application, the display parameter may be a parameter that specifically represents a font style, a font size, a font color, an icon color, an icon size, a background color, a background pattern, or a control attribute, or may be an identifier corresponding to a different font style, font size, font color, icon color, icon size, background color, background pattern, control attribute, or the like, for example, a display style identifier ID1 corresponding to a display parameter A, a corresponding font Song typeface, a font color black, a background color white, while a display style identifier ID2 corresponding to a display parameter B, corresponding font regular script, font color light gray, and background color black.

In a possible implementation of the first aspect, the method includes: receiving, by the first electronic device, the second display parameter sent by the second electronic device, and generating the third interface based on the received second display parameter, where the third interface includes the first content and has the second display parameter.

That is, in this embodiment of this application, the first electronic device generates a third interface whose display content is the same as that of the first interface of the first electronic device, but whose display style is the same as that of the second interface of the second electronic device, and then projects the third interface to the second electronic device.

In a possible implementation of the first aspect, the first electronic device generates the third interface in the following manner: the first electronic device sets a font size in the third interface to be the same as a font size in the second interface of the second electronic device, reduces a quantity of characters in the third interface, and modifies an attribute of at least one control in the third interface to be invisible.

In a possible implementation of the first aspect, a font size of the first window is greater than a font size of the first interface and is the same as a font size of the second interface of the second electronic device; a quantity of characters in the first window is less than a quantity of characters in the first interface; and an attribute of at least one control of the first content in the first interface is visible, and the attribute of the at least one control of the first content in the first window is invisible. For example, if the display style of the second interface of the second electronic device is an elder-person mode or a simplified mode, and the first electronic device is not in an elder-person mode, compared with the first interface of the first electronic device, after the display style of the first display content in the first window is adjusted to the elder-person mode or the simplified mode of the second electronic device, the font becomes large, and the corresponding quantity of characters decreases after the font becomes large.

In a possible implementation of the first aspect, the first electronic device generates the third interface in the following manner: the first electronic device adjusts a background color in the third interface to be the same as a background color in the second interface of the second electronic device, and adjusts a color of a character and an icon in the third interface to be different from the background color.

In a possible implementation of the first aspect, a background color of the first window is the same as a background color of the second content in the second interface or a fourth interface of the second electronic device, and a color of a character and an icon in the first window is different from the background color.

For example, if a display style of the second interface of the second electronic device is a dark color mode, that is, a background color of the second electronic device is a dark color, a character and an icon thereof are light colors, and a background color of the first interface of the first electronic device is a light color, and a character and an icon are dark colors. During screen projection, a background color of the third interface generated by the first electronic device also changes to a dark color, and after projection to the second electronic device, a background color of the first display content in the first window is also a dark color, and colors corresponding to a character and an icon are also changed to light colors.

In a possible implementation of the first aspect, the third interface is an invisible view in the first electronic device or the third interface is generated on a virtual screen of the first electronic device.

In a possible implementation of the first aspect, a size of the third interface is less than a size of a screen of the first electronic device, and the third interface and the first interface are simultaneously displayed on the screen of the first electronic device.

That is, in this embodiment of this application, the first electronic device may generate the third interface in a picture-in-picture manner.

In a possible implementation of the first aspect, the first electronic device further obtains a size of the first window from the second electronic device, and a size of the third interface generated by the first electronic device is the same as the size of the first window.

That is, in this embodiment of this application, the second electronic device displays the third interface in a local screen projection region in the display interface of the second electronic device.

For example, the first electronic device herein may be a mobile phone, and the second electronic device is a smartwatch. The third interface is a window created by the mobile phone, and the window and the display interface of the mobile phone are displayed at the same time. A size of the window may be a size of a local screen projection region obtained by the mobile phone from the smartwatch.

In a possible implementation of the first aspect, the first electronic device further obtains a size of the first window from the second electronic device; and when a size of the third interface generated by the first electronic device is different from the size of the first window, the first electronic device sends the third interface whose size is reduced or enlarged to be the same as the size of the first window to the second electronic device.

That is, in this embodiment of this application, the first electronic device may reduce or enlarge the third interface, and then send the third interface to the second electronic device. The second electronic device displays the third interface in a local screen projection region of the screen, that is, the first window.

For example, after the mobile phone obtains the size of the first window from the smartwatch, the mobile phone determines that the size of the first window is less than a size of a screen projection interface of the mobile phone. After reducing the screen projection interface, the mobile phone sends the screen projection interface to the smartwatch.

In a possible implementation of the first aspect, the screen coordination system further includes a third electronic device, and the method further includes: further establishing, by the first electronic device, a multi-screen coordination connection to the third electronic device, and displaying, by the third electronic device, a fifth interface, where the fifth interface includes third content, and the fifth interface has a third display parameter; sending, by the first electronic device, a sixth interface to the third electronic device; and in response to the received sixth interface, displaying, by the third electronic device, a seventh interface, where the seventh interface includes the third content and a second window, the second window includes the first content, and the first content in the second window has the third display parameter.

That is, the first electronic device may simultaneously project the first interface to the second electronic device and the third electronic device, and separately correspond to display styles of the second electronic device and the third electronic device, and correspondingly generate the third interface and the seventh interface, so that when the first content is displayed on the second electronic device and the third electronic device, the display style is the same as those of the second electronic device and the third electronic device.

In a possible implementation of the first aspect, the sixth interface includes the first content and has a third display parameter.

In a possible implementation of the first aspect, when the user determines to modify the display style, the first electronic device generates and sends a third interface to the second electronic device. In addition, when the user determines not to modify the display style, the first electronic device sends the first interface to the second electronic device, and the second electronic device displays an eighth interface in response to the received first interface, where the eighth interface includes the second content and a third window, and the third window includes the first interface.

That is, in this embodiment of this application, the user may determine whether to modify a display style in a multi-screen coordination display process to perform screen projection.

In a possible implementation of the first aspect, the first interface of the first electronic device includes at least one of a display desktop, a left slide display interface, a drop-down menu, and an application display interface of the first electronic device.

A second aspect of this application provides an inter-device screen coordination method, including: establishing, by a first electronic device, a multi-screen coordination connection to a second electronic device; displaying, by the first electronic device, a first interface, where the first interface includes first content, and the first interface has a first display parameter; receiving, by the first electronic device, a second display parameter sent by the second electronic device, where the second electronic device has a display second interface, the second interface includes second content, and the second interface has the second display parameter; generating, by the first electronic device, a third interface according to the second display parameter; and sending, by the first electronic device, the third interface to the second electronic device, where the third interface includes the first content and has the second display parameter.

In a possible implementation of the second aspect, a display parameter includes at least one of a font style, a font size, a font color, an icon color, an icon size, a background color, a background pattern, and a control attribute; and the display parameter includes the first display parameter and the second display parameter.

In a possible implementation of the second aspect, the second display parameter includes a display style identifier corresponding to a display style of the second interface of the second electronic device, and corresponding to different display style identifiers, at least one of a font style, a font size, a font color, an icon color, an icon size, a background color, a background pattern, and a control attribute of the second interface of the second electronic device is different.

In a possible implementation of the second aspect, the third interface includes the first content and has the second display parameter.

In a possible implementation of the second aspect, a font size of the first interface of the first electronic device is less than a font size of a first window of the second electronic device, and a quantity of characters of the first interface is greater than a quantity of characters of the first window; and an attribute of at least one control of the first content in the first interface is visible, and the attribute of the at least one control of the first content in the first window is invisible.

In a possible implementation of the second aspect, a background color of the first interface on the first electronic device is different from a background color of a first window in a fourth interface on the second electronic device.

In a possible implementation of the second aspect, the screen coordination system further includes a third electronic device, where the third electronic device displays a fifth interface, the fifth interface includes third content, the fifth interface has a third display parameter, and the method further includes: establishing, by the first electronic device, a multi-screen coordination connection to the third electronic device; and sending, by the first electronic device, a sixth interface to the third electronic device, so that the sixth interface causes the third electronic device to display a seventh interface, where the seventh interface includes third content and a second window, the second window includes the first content, and the first content in the second window has a third display parameter.

In a possible implementation of the second aspect, the sixth interface includes the first content and has the third display parameter.

In a possible implementation of the second aspect, when the user determines to modify the display style, the first electronic device generates and sends a third interface to the second electronic device. In addition, when the user determines not to modify the display style, the first electronic device sends the first interface to the second electronic device, where the first interface causes the second electronic device to display an eighth interface, the eighth interface includes the second content and the third window, and the third window includes the first interface.

In a possible implementation of the second aspect, the first interface of the first electronic device includes at least one of a display desktop, a left slide display interface, a drop-down menu, and an application display interface of the first electronic device.

A third aspect of this application provides an apparatus, where the apparatus is included in an electronic device, and the apparatus has a function of implementing behavior of the electronic device in the foregoing aspects and the possible implementations of the foregoing aspects. The function may be implemented by hardware, or may be implemented by corresponding software executed by hardware. The hardware or the software includes one or more modules or units corresponding to the function. For example, a communication connection unit or module (for example, may be a Bluetooth or Wi-Fi module), a display parameter obtaining unit or module, a display interface generation unit or module, and a multi-screen coordination unit or module (for example, a processor that has a function of the module or unit). For example, the communication connection unit or module is configured to support establishing a multi-screen coordination connection between a first electronic device and a second electronic device in a plurality of electronic devices. The display parameter obtaining unit or module is configured to support the first electronic device to receive a second display parameter from the second electronic device. The display interface generation unit or module is configured to support the first electronic device to generate a third interface according to the second display parameter received by the display parameter obtaining unit or module, where the third interface includes first content of a first interface of the first electronic device, and the first content has a second display parameter. The multi-screen coordination unit or module is configured to support the first electronic device to send the third interface to the second electronic device. The second electronic device displays a fourth interface in response to the received third interface, where the fourth interface includes second content and a first window, the first window includes the first content, and the first content in the first window has the second display parameter.

A fourth aspect of this application provides an electronic device, including: a memory, storing instructions; and a processor, where the processor is coupled to the memory. When program instructions stored in the memory are executed by the processor, the electronic device performs the inter-device screen coordination method provided in the first aspect or the second aspect.

A fifth aspect of this application provides a readable medium, where the readable medium stores instructions, and when the instructions run on the readable medium, the readable medium performs the inter-device screen coordination method provided in the first aspect or the second aspect.

DETAILED DESCRIPTION OF ILLUSTRATIVE EMBODIMENTS

Embodiments of this application are further described in detail below with reference to the accompanying drawings.

To resolve a problem that display styles of two electronic devices in the foregoing screen projection process are inconsistent, this application provides a screen projection solution. In the screen projection solution in the embodiments of this application, an electronic device modifies a display style of to-be-projected display content according to a display style of a screen-projected device, and then performs screen projection. A display style of the electronic device may be represented by using a display parameter, where the display parameter includes at least one of a font style, a font size, a font color, an icon color, an icon size, a background color, a background pattern, and a control attribute. A display interface described in this application has a display parameter, which may mean that display content on the display interface is displayed according to a specific parameter.

Figure 2:
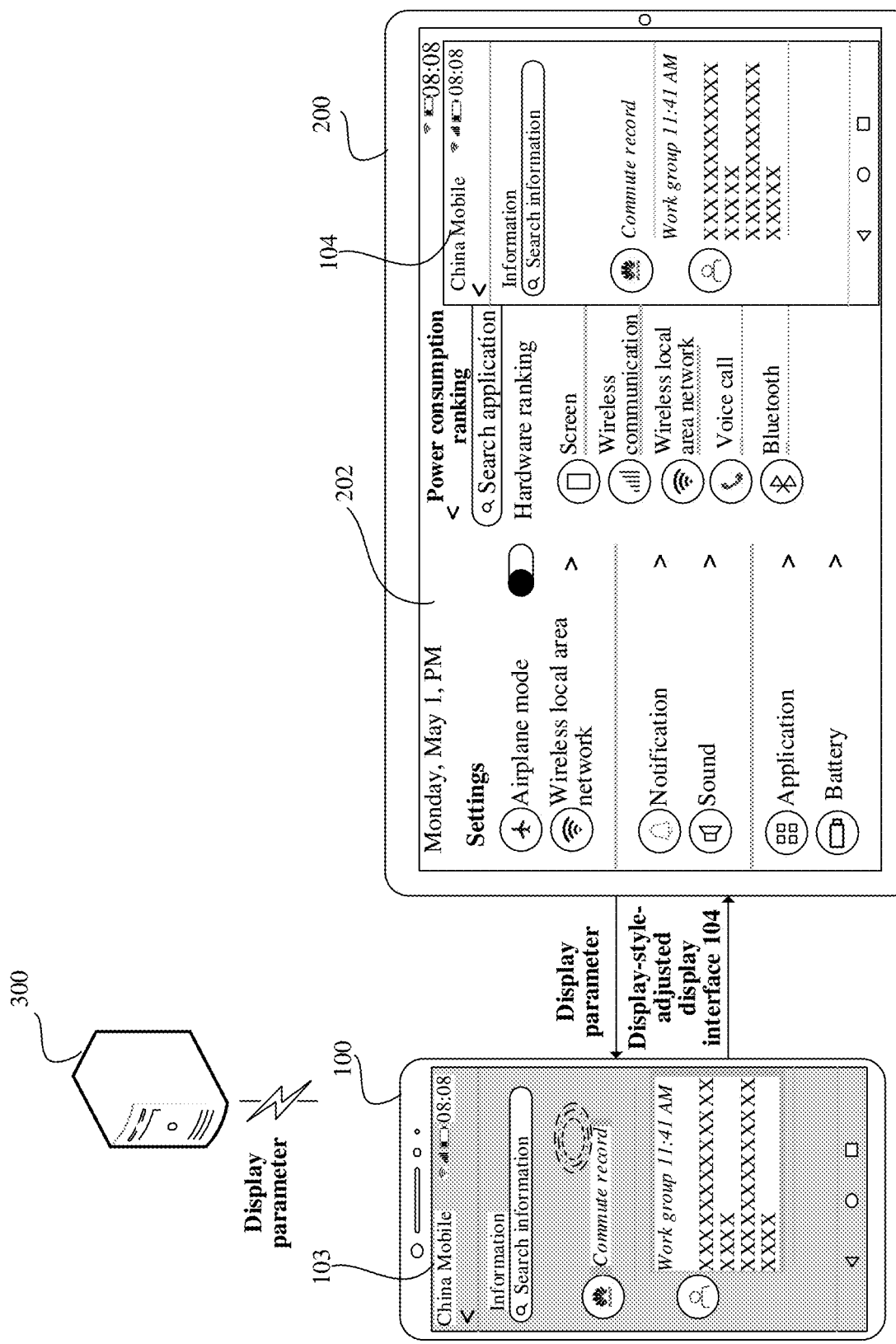
FIG. 2 shows a screen coordination system according to an embodiment of this application.

FIG. 2 shows a screen coordination system according to some embodiments of this application.

Specifically, as shown in FIG. 2, the screen coordination system includes a first electronic device 100, a second electronic device 200, and a server 300. The first electronic device 100 can separately perform wireless communication with the second electronic device 200 and the server 300. When the first electronic device 100 projects a screen to the second electronic device 200, the first electronic device 100 may obtain a display parameter of a current display interface 202 of the second electronic device 200 from the second electronic device 200. Then, the first electronic device 100 generates a projection interface 104, and display content of the projection interface 104 is the same as display content of a display interface 103 currently displayed on the first electronic device 100. However, the first electronic device 100 adjusts, according to the obtained display parameter of the second electronic device 200, a display parameter of the projection interface 104 to be the same as that sent by the second electronic device 200, so that a display style of the projection interface 104 is consistent with a display style of the display interface 202 of the second electronic device 200. Then, the first electronic device projects the display style-adjusted projection interface 104 to the second electronic device 200, and in this process, an original display style of the current display interface 103 of the first electronic device 100 may not be changed.

It may be understood that, in some embodiments of this application, the display parameter may include parameters such as a font style, a font size, a font color, an icon color, an icon size, a background color, a background pattern, and a control attribute that are of a character being used in the display interface 202 of the second electronic device 200. Details are described in the following. It may be understood that, for some electronic devices, such as a mobile phone or a tablet computer, a font style, a font size, a font color, an icon color, an icon size, a background color, a background pattern, a control attribute, or the like may also be included in a theme mode, for example, an elderly-person mode (simplified mode), a dark mode, or the like. The control herein may include an icon, a key, a menu, a tab, a text box, a dialog box, a status bar, a navigation bar, and the like that are on the display interface 103 of the first electronic device 100. The control attribute may include a size, a position, an arrangement order, whether to display, and the like of the control.

When the first electronic device 100 does not have a display function represented by the display parameter of the second electronic device 200, for example, when the first electronic device 100 does not have a display function corresponding to a parameter such as a font size, a font style, a background pattern, or a background color in the display parameter, the first electronic device 100 may further obtain the foregoing missing display function by using the server 300. The server 300 may be configured to store and update a display function, and send the stored or updated display function to the first electronic device 100 in response to a request of the first electronic device 100.

As shown in FIG. 2, the server 300 may collect and update the display function. For example, the server 300 may collect, from each electronic device (such as each second electronic device 200) or from each font size, font style, background pattern, background color, and control attribute, or a developer of a theme mode, various display functions included in different display styles (for example, a developer registers or uploads a font size, a font style, a background pattern, a background color, a control attribute, and a theme mode in an application store of the server 300; in another example, the server 300 requests each electronic device to report a font size, a font style, a background pattern, a background color, a control attribute, and a theme mode that are stored in the electronic device). The server 300 may further send, to the first electronic device 100 based on a request of the first electronic device 100 or in a manner of periodically pushing, a newly collected display style parameter such as a font size, a font style, a background pattern, a background color, a control attribute, and a theme mode.

In addition, it may be understood that, in this embodiment of this application, a local screen projection region of the first electronic device 100 in the second electronic device 200 may be a local screen projection region that is in a screen of the second electronic device 200 and that has a same size as the display interface 103 or the screen of the first electronic device 100. For example, the display interface on the mobile phone is projected to a local screen projection region of a tablet computer whose screen size is greater than that of the mobile phone. Alternatively, the display interface of the electronic device may be reduced and projected to the second electronic device 200, for example, in an application scenario in which a region in which the second electronic device 200 receives screen projection or the screen size of the second electronic device 200 may be smaller than the size of the display interface 103 of the first electronic device 100. In addition, the first electronic device 100 may also simultaneously project the display interface 103 on the screen to a plurality of second electronic devices 200, and separately adapt to a display style of each second electronic device 200 for screen projection.

FIG. 3a to FIG. 3e respectively show a plurality of screen projection scenarios. In the scenario shown in FIG. 3a, for example, the first electronic device 100 is the mobile phone 100, and the second electronic device 200 is the tablet computer 200. The mobile phone 100 performs the foregoing multi-screen coordination display with the tablet computer 200. That is, the mobile phone 100 displays the display interface 103 in a local screen projection region of the display interface 202 on the tablet computer 200. A size of the local screen projection region is the same as the size of the current display interface 103 of the mobile phone 100. During screen projection, the mobile phone 100 may obtain the display parameter of the display interface 202 of the tablet computer 200, adjust the display parameter of the display interface 103 according to the obtained display parameter of the tablet computer 200, so as to adjust the display style of the display interface 103. For example, in FIG. 3a, the mobile phone 100 may generate a projection interface 104 in a non-display mode (that is, invisible to a user). Display content of the projection interface 104 is the same as that of the display interface 103, and a font style of the projection interface 104 is modified from regular script to Song typeface, a background color is modified from pink to white, a background pattern is modified from a ripple pattern to a no ripple pattern, and the current display interface 103 in the screen of the mobile phone 100 is kept unchanged. Finally, the display-style-modified projection interface 104 is projected to the local screen projection region of the tablet computer 200. It may be learned from FIG. 3a that the display style of the projection interface 104 of the mobile phone 100 displayed on the display interface 202 of the tablet computer 200 is consistent with the display style of the display interface 202 of the tablet computer 200.

Figure 3A:
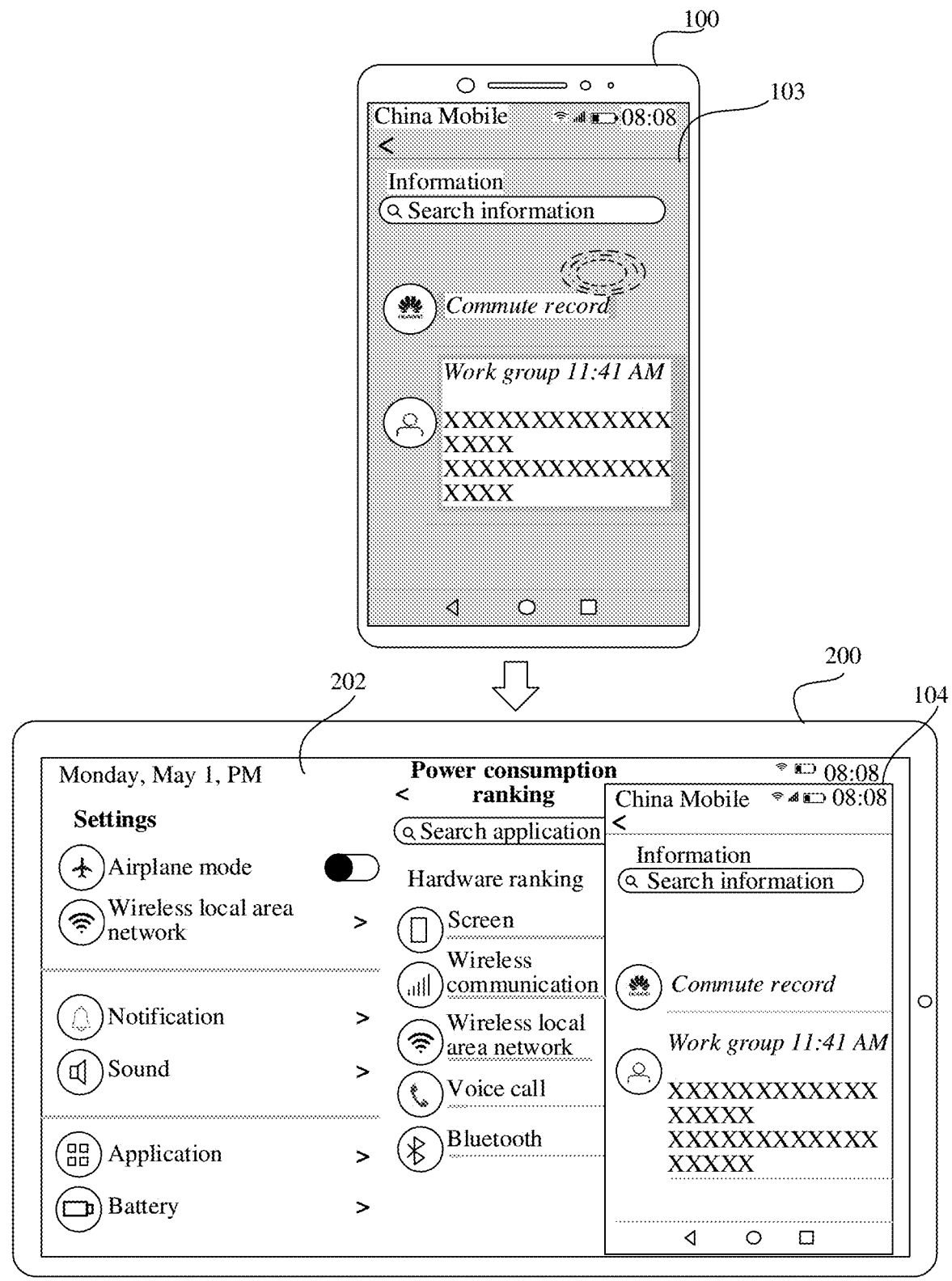
FIG. 3a shows a screen projection scenario between electronic devices according to an embodiment of this application.
Figure 3B:
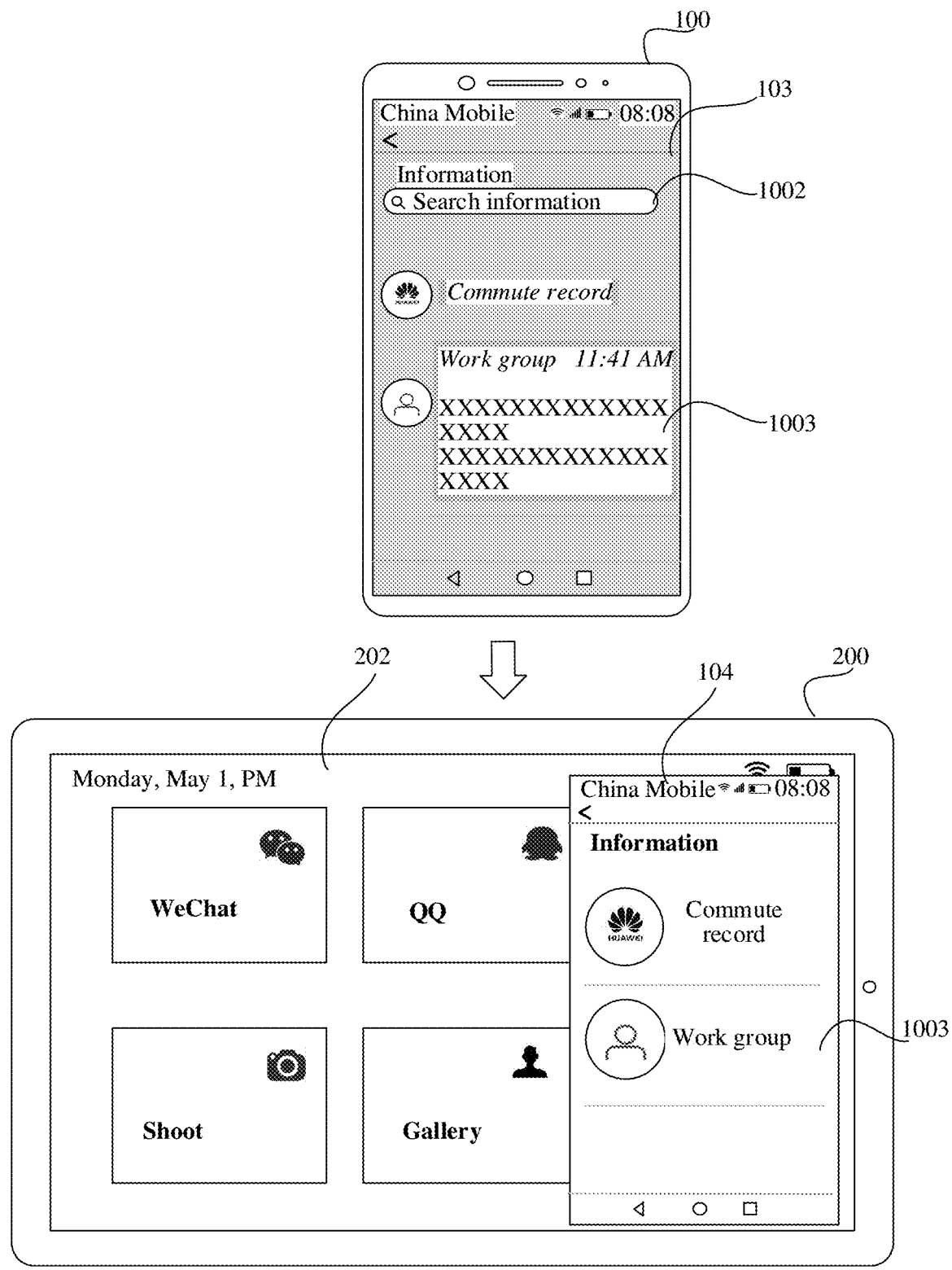
FIG. 3b shows a screen projection scenario between electronic devices according to an embodiment of this application.

In the scenario shown in FIG. 3b, for example, the first electronic device 100 and the second electronic device 200 are respectively the mobile phone 100 and the tablet computer 200. In addition, the mobile phone 100 performs multi-screen coordination display with the tablet computer 200. An instant messaging application (Application, APP) is displayed on the current display interface 103 of the mobile phone, and a display style of the current display interface 202 of the tablet computer 200 is an elderly-person mode (simplified mode). After the display parameter obtained by the mobile phone 100 from the tablet computer 200 indicates the elder-person mode, the mobile phone 100 may create a projection interface 104 (invisible to the user in a non-display mode) whose display content is the same as that of the current display interface 103 of the mobile phone 100; and corresponding to the elder-person mode, the mobile phone 100 adjusts a font size of a character in the projection interface 104 to be larger, modifies a font style from regular script to Song typeface, modifies a background color from pink to white, modifies a background pattern from a ripple pattern to a no ripple pattern, and simplifies display content of the current instant messaging APP. For example, a search bar 1002 in the instant messaging APP in the projection interface 104 is set to not to be displayed, and at the same time, a content preview of the "work group" in a communication column 1003 is set to not to be displayed (it may be understood that in another embodiment, text content in the work group may be reduced), and finally, the display-style-modified projection interface 104 is projected to a local screen projection region of the tablet computer 200. It may be learned from FIG. 3b that the display style of the projection interface 104 of the mobile phone 100 displayed on the display interface 202 of the tablet computer 200 is consistent with the display style of the display interface 202 of the tablet computer 200.

Figure 3C:
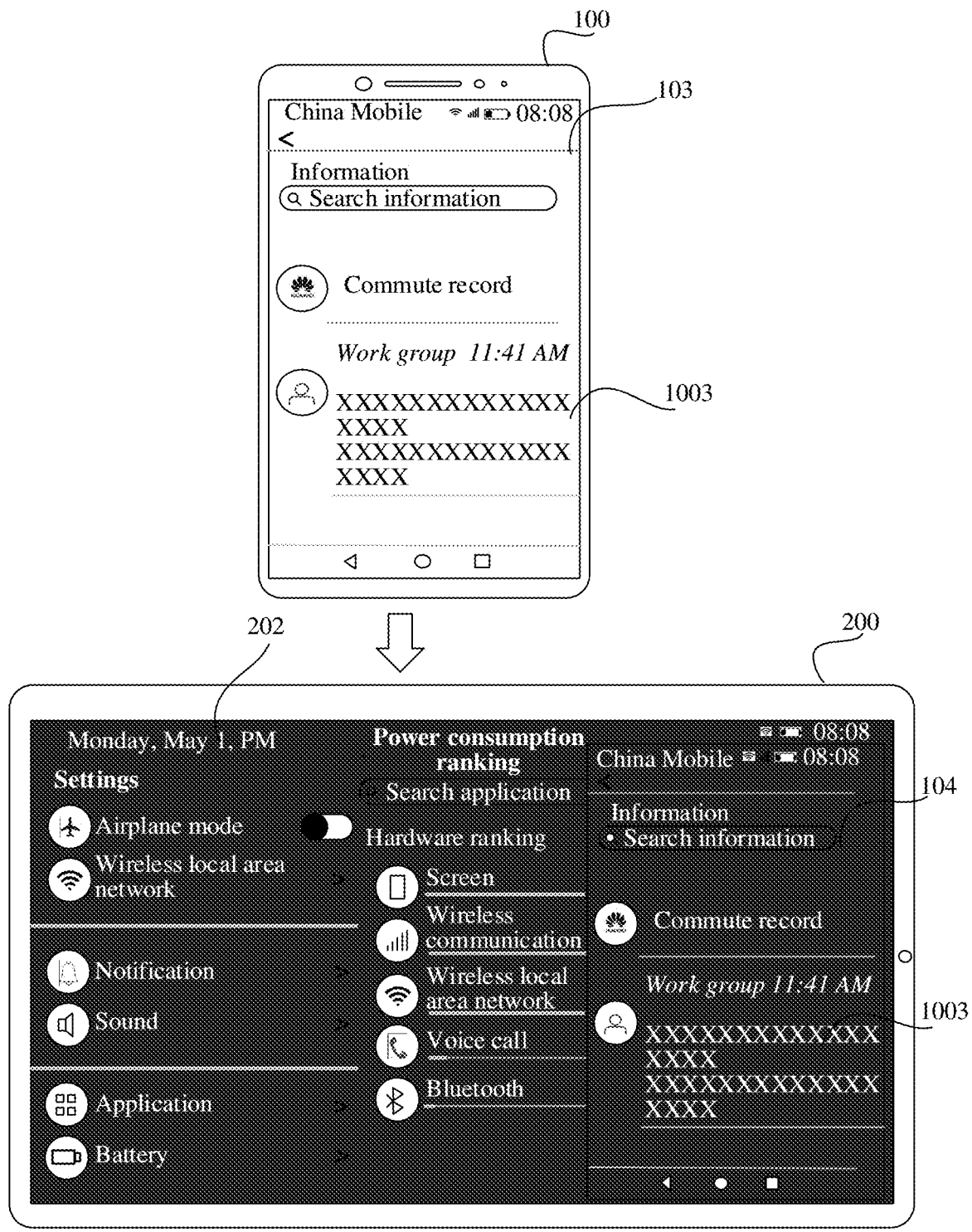
FIG. 3c shows a screen projection scenario between electronic devices according to an embodiment of this application.

FIG. 3c is similar to the scenario shown in FIG. 3b, except that the display style of the tablet computer 200 is a dark mode. When the mobile phone 100 obtains, from the tablet computer 200, a display parameter indicating a dark color mode or an obtained display parameter includes a background color, an icon color, a font color, and the like, the mobile phone 100 may also create a projection interface 104 (invisible to the user in the non-display mode) whose display content is the same as that of the current display interface 103 of the mobile phone 100; and corresponding to the dark color mode, the mobile phone 100 sets text content of the instant messaging APP in the projection interface 104 and an icon in the communication column 1003 to a light color, such as white, and changes the background color to the same dark color as the display interface 202 of the tablet computer 200. Finally, the display-style-modified projection interface 104 is projected to the local screen projection region of the tablet computer 200. It may be learned from FIG. 3c that the display style of the projection interface 104 of the mobile phone 100 displayed on the display interface 202 of the tablet computer 200 is consistent with the display style of the display interface 202 of the tablet computer 200.

Figure 3D:
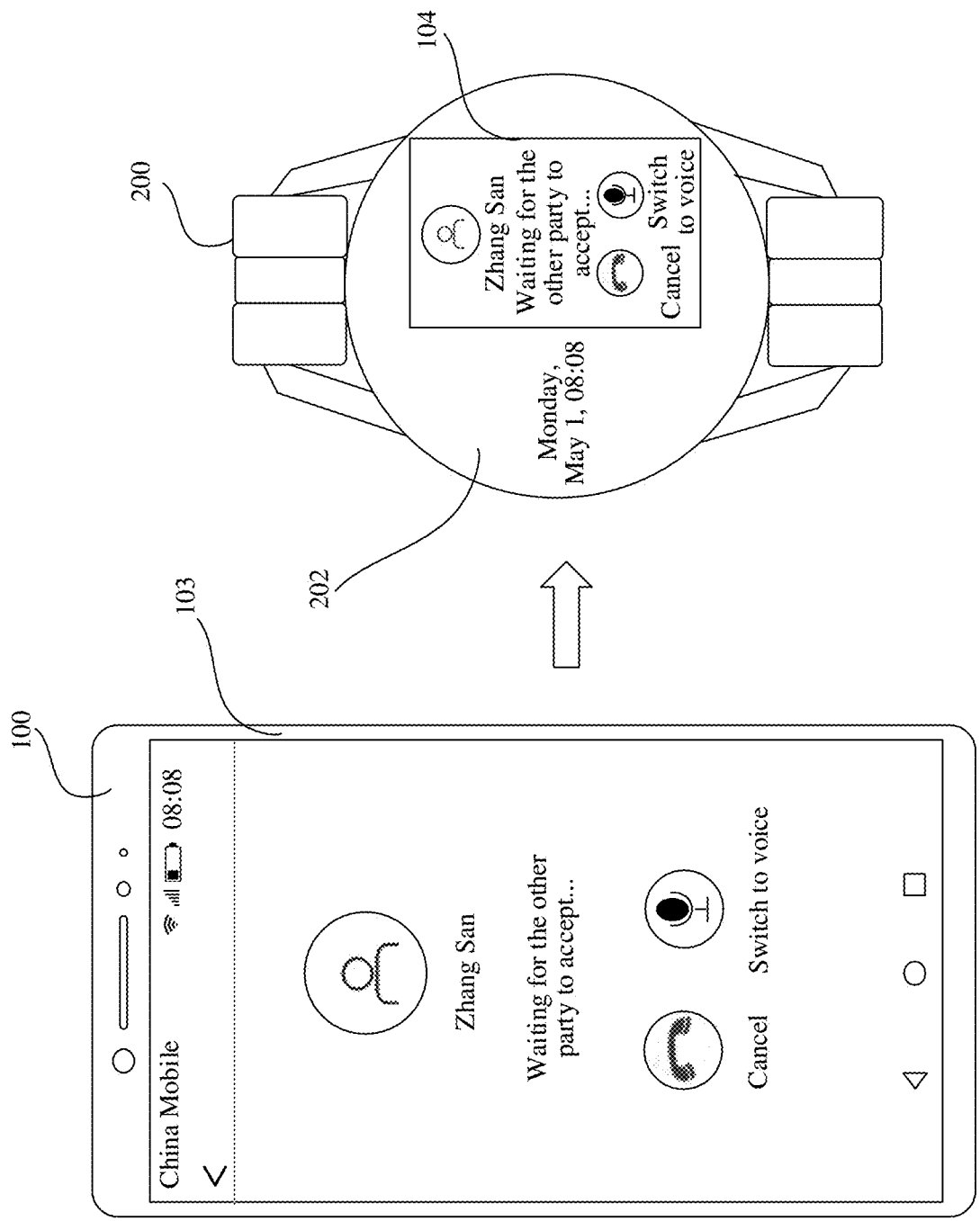
FIG. 3d shows a screen projection scenario between electronic devices according to an embodiment of this application.

In the scenario shown in FIG. 3d, for example, the first electronic device 100 is a mobile phone, and the second electronic device 200 is a smartwatch. A screen of the smartwatch 200 is smaller than a screen of the mobile phone 100 or a size of the display interface 103 on the mobile phone 100. When the mobile phone 100 projects the display interface 103 to a local screen projection region of the display interface 202 of the smartwatch 200, the display interface 103 may be reduced at an equal proportion, and then sent to the smartwatch 200 for display. Specifically, during screen projection, the mobile phone 100 obtains a display parameter of the smartwatch 200 and size information of a local screen projection region that is used by the smartwatch 200 for screen projection, and the mobile phone 100 adjusts the display parameter of the display interface 103 according to the display parameter of the watch 200, so as to adjust a display style of the display interface 103. For example, as shown in FIG. 3d, a font in the display interface 202 of the smartwatch 200 is Song typeface, and a font in the display interface 103 of the mobile phone 100 is regular script. According to the font parameter in the display parameter, the mobile phone 100 may modify the font style in the generated projection interface 104 from regular script to Song typeface, and then reduce the projection interface 104 at an equal proportion according to the obtained size information of the local screen projection region and project the projection interface 104 to the local screen projection region of the display interface 202 of the smartwatch 200. It can be learned from FIG. 3d that the display style of the projection interface 104 of the mobile phone 100 displayed on the display interface 202 of the smartwatch 200 is consistent with a display style of the display interface 202 of the smartwatch 200. In addition, it may be understood that, after generating the projection interface 104, the mobile phone 100 may also directly send the projection interface 104 to the smartwatch 200. The smartwatch 200 reduces the projection interface 104 according to the size of the local screen projection region that is used by the smartwatch 200 for screen projection, and displays the projection interface 104 on the display interface 202 of the smartwatch 200.

Figure 3E:
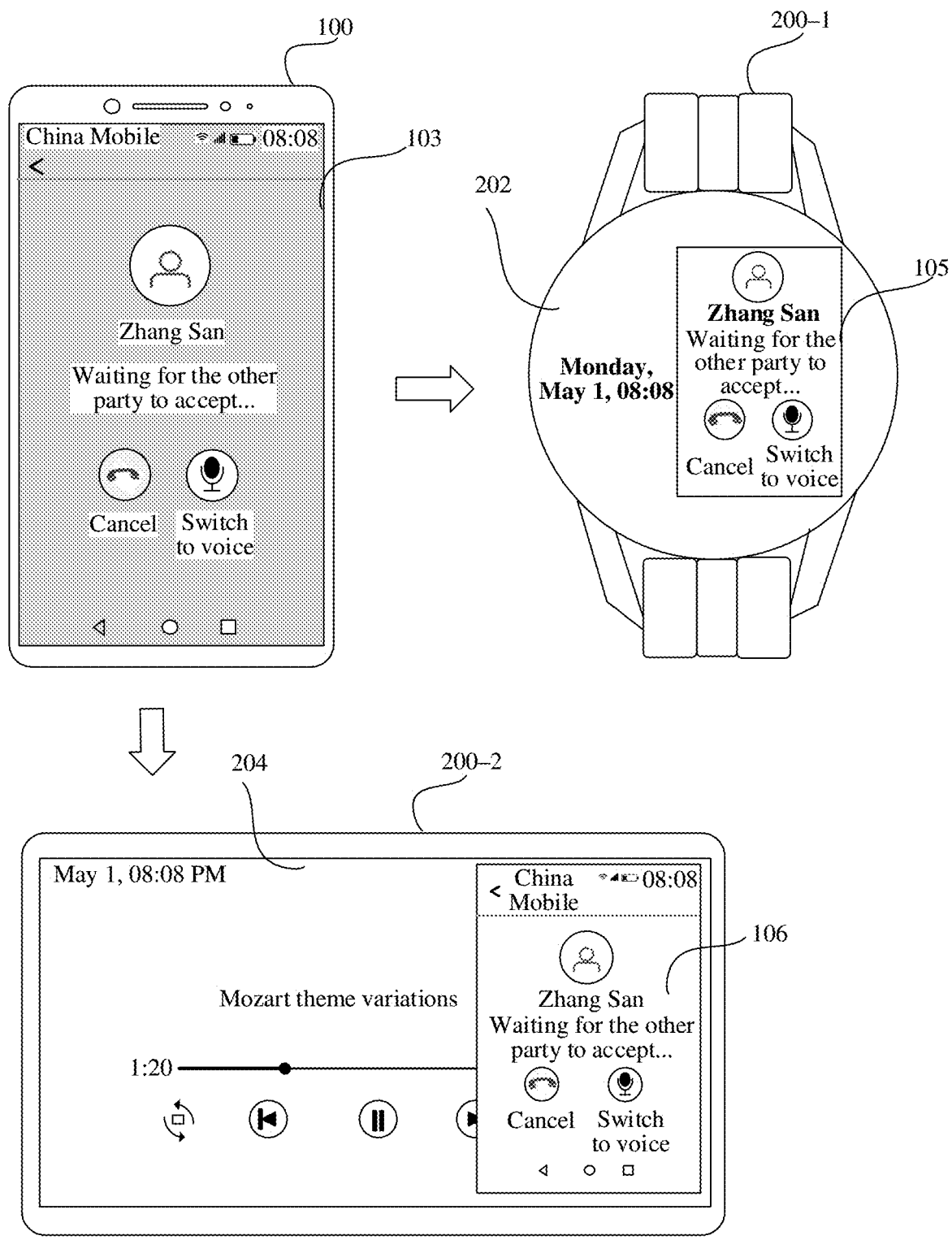
FIG. 3e shows a screen projection scenario between electronic devices according to an embodiment of this application.

In the scenario shown in FIG. 3e, a scenario in which a display interface of the first electronic device 100 is simultaneously projected to a plurality of second electronic devices 200 is disclosed. For example, the display interface 103 of the mobile phone 100 is simultaneously projected to a smartwatch 200-1 and an in-vehicle infotainment 200-2. As shown in FIG. 3e, during screen projection, the mobile phone 100 may receive respective corresponding display parameters from the smartwatch 200-1 and the in-vehicle infotainment 200-2, and then create, according to the display parameters of the smartwatch 200-1 and the in-vehicle infotainment 200-2, a first projection interface 105 and a second projection interface 106 that are respectively corresponding to the smartwatch 200-1 and the in-vehicle infotainment 200-2, and project the created first projection interface 105 and second projection interface 106 to the smartwatch 200-1 and the in-vehicle infotainment 200-2, respectively. Specifically, as shown in FIG. 3e, a font of a character in the display interface 103 of the mobile phone 100 is regular script, and a background color is pink. A font of a character in the display interface 202 of the smartwatch 200-1 is STCaiyun, and a background color is white. A font of a character in a display interface 204 of the in-vehicle infotainment 200-2 is Song typeface, and a background color is white. Therefore, when the first projection interface 105 is generated, the mobile phone modifies the font style in the first projection interface 105 from regular script to STCaiyun, modifies the background color to white, and then projects the display-style-modified first projection interface 105 to the local screen projection region of the display interface 202 of the smartwatch 200-1 in an equal proportion scaling manner. In addition, the mobile phone 100 may modify the font style in the second projection interface 106 from regular script to Song typeface, and then project the display-style-modified second projection interface 106 to the local screen projection region of the display interface 204 of the in-vehicle infotainment 200-2. It may be learned from FIG. 3e that, after screen projection, display styles of the first projection interface 105 and the second projection interface 106 that are respectively displayed by the two electronic devices are respectively consistent with the display styles of the display interface 202 and the display interface 204 of the smartwatch 200-1 and the in-vehicle infotainment 200-2.

The first electronic device 100 and the second electronic device 200 in this application may be various computing devices that can communicate with each other. For example, the first electronic device 100 and the second electronic device 200 each may include but are not limited to a laptop computer, a desktop computer, a tablet computer, a mobile phone, a server, a wearable device, a head-mounted display, a mobile e-mail device, an in-vehicle infotainment device, a portable game console, a portable music player, a reader device, a television that is embedded or coupled with one or more processors, or another electronic device that can access a network.

In the following description, for ease of description, the technical solution of this application is described by using an example in which the first electronic device 100 is the mobile phone 100, and the second electronic device 200 is the tablet computer 200. For ease of description, the following uses multi-screen coordination display between the mobile phone 100 and the tablet computer 200 as an example for description. However, it may be understood that the screen projection solution in this application is applicable to a screen projection function between any electronic devices.

Figure 4:
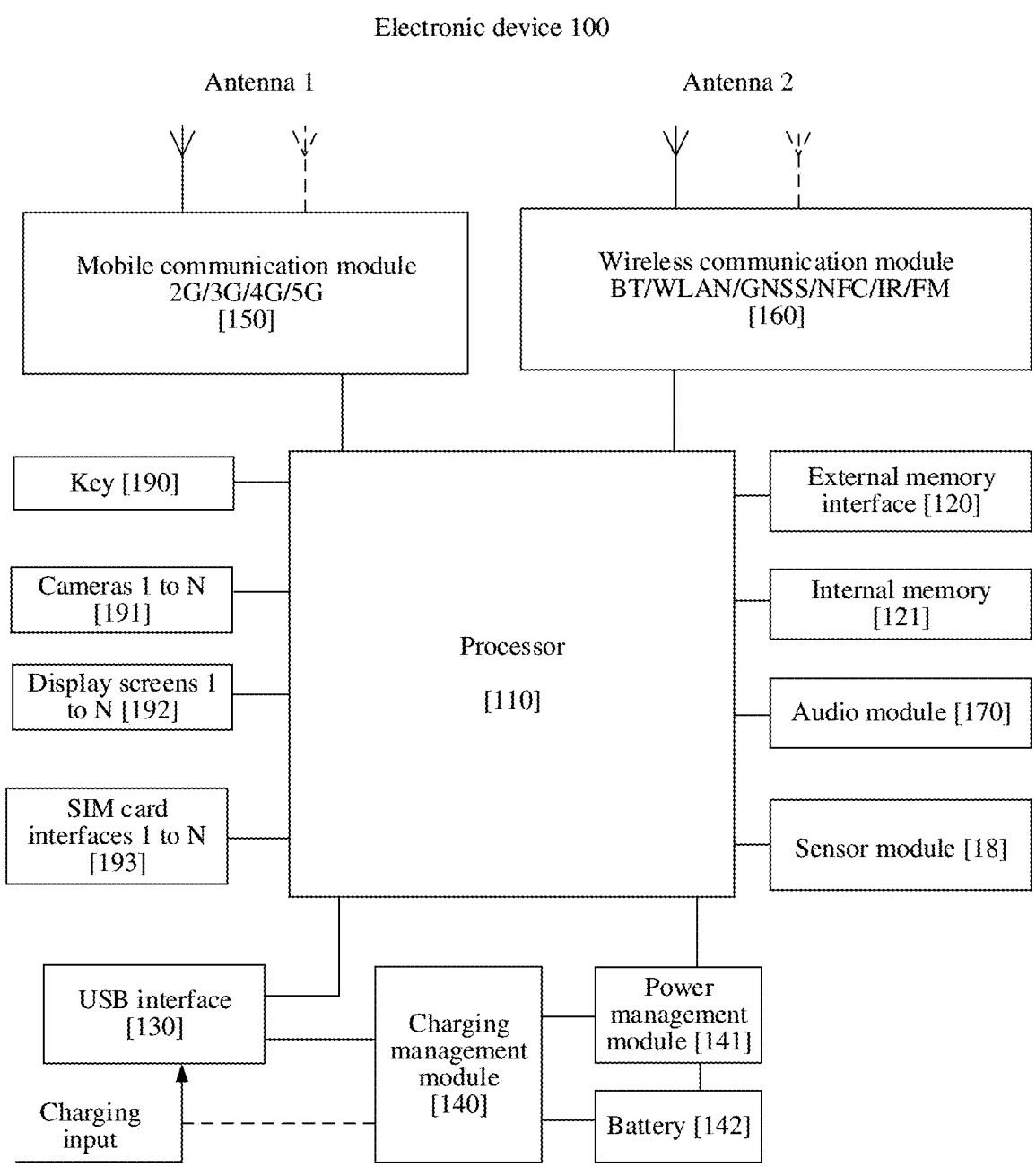
FIG. 4 is a block diagram of a hardware structure of an electronic device according to an embodiment of this application.

FIG. 4 is a schematic structural diagram of the mobile phone 100 or the tablet computer 200.

As shown in FIG. 4, the mobile phone 100 or the tablet computer 200 may include a processor 110, an external memory interface 120, an internal memory 121, a universal serial bus (universal serial bus, USB) interface 130, a charging management module 140, a power management module 141, a battery 142, an antenna 1, an antenna 2, a wireless communication module 160, an audio module 170, a sensor module 180, a key 190, a camera 191, a display interface 192, and a subscriber identity module (subscriber identification module, SIM) card interface 193.

It may be understood that a structure shown in this embodiment of the present invention does not constitute a specific limitation on the mobile phone 100 and the tablet computer 200. In some other embodiments of this application, the mobile phone 100 and the tablet computer 200 may include more or fewer components than those shown in the figure, or combine some components, or split some components, or have different component arrangements. The components shown in the figure may be implemented by hardware, software, or a combination of software and hardware.

The processor 110 may include one or more processing units, and a memory may be further disposed in the processor 110 to store an instruction and data. If the processor 11o needs to use the instruction or the data again, the instruction or the data may be directly invoked from the memory.

The USB interface 130 is a USB-compliant interface, and may be specifically a mini USB interface, a micro USB interface, a USB Type C interface, or the like.

The charging management module 140 is configured to receive a charging input from a charger. The power management module 141 is configured to connect to the battery 142, the charging management module 140, and the processor 11o. A wireless communication function of each of the mobile phone 100 and the tablet computer 200 may be implemented by using the antenna 1, the antenna 2, the mobile communication module 150, the wireless communication module 160, the modem processor, the baseband processor, and the like.

The antenna 1 and the antenna 2 are configured to transmit or receive an electromagnetic wave signal.

The mobile communication module 150 can provide a solution for wireless communication including 2G/3G/4G/5G and the like to be applied to the mobile phone 100 and the tablet computer 200.

The wireless communication module 160 can provide a solution for wireless communication including a wireless local area network (wireless local area networks, WLAN) (such as a Wi-Fi network), Bluetooth (bluetooth, BT), a global navigation satellite system (global navigation satellite system, GNSS), frequency modulation (frequency modulation, FM), a near field communication technology (near field communication, NFC), an infrared technology (infrared, IR) and the like to be applied to the mobile phone 100 and the tablet computer 200. The wireless communication module 160 may be one or more devices that integrate at least one communication processing module.

It may be understood that, in this embodiment of the present invention, the mobile phone 100 and the tablet computer 200 may communicate with the tablet computer 200 and the server 300 by using the mobile communication module 150 or the wireless communication module 160. Multi-screen coordination display is performed between the mobile phone 100 and the tablet computer 200, and after a multi-screen coordination display request is sent to the tablet computer 200, a window of the mobile phone 100 is displayed on the tablet computer 200. In addition, the mobile phone 100 may further obtain a display parameter from the tablet computer 200, and obtain a missing display function from the server 300.

The mobile phone 100 implements a display function by using the GPU, the display screen 192, the application processor, and the like. The GPU is a microprocessor for image processing, and is connected to the display screen 192 and the AP. The GPU is configured to perform mathematical and geometric calculation, and is configured to render graphics. The processor 110 may include one or more GPUs, and execute program instructions to generate or change display information.

The display screen 192 is configured to display an image, a video, and the like. The display screen 192 includes a display panel. In some embodiments, the mobile phone 100 and the tablet computer 200 may each include one or N display screens 192, where N is a positive integer greater than 1.

The mobile phone 100 can implement a photographing function by using the ISP, the camera 191, the video codec, the GPU, the display screen 192, the application processor, and the like.

The external memory interface 120 may be configured to connect to an external storage card such as a micro SD card, to extend a storage capability of the mobile phone 100. The external storage card communicates with the processor 110 by using the external memory interface 120, to implement a data storage function, for example, storing a file such as a music or a video in the external storage card.

The internal memory 121 may be configured to store computer executable program code, and the executable program code includes instructions. The internal memory 121 may include a program storage area and a data storage area. The program storage area may store an operating system, an application required by at least one function (such as a voice playing function and an image playing function), and the like. The data storage area may store data (such as audio data and an address book) created during use of the mobile phone 100, and the like. In addition, the internal memory 121 may include a high-speed random access memory, and may further include a non-volatile memory, for example, at least one disk storage device, a flash memory device, or a universal flash storage (universal flash storage, UFS). The processor 11o executes various functional applications and data processing of the mobile phone 100 and the tablet computer 200 by running an instruction stored in the internal memory 121 and/or an instruction stored in the memory disposed in the processor. For example, in this embodiment of the present invention, the internal memory 121 may be configured to store a display parameter.

The mobile phone 100 and the tablet computer 200 can implement an audio function, for example, music playback and recording, by using the audio module 170, the speaker 170A, the phone receiver 170B, the microphone 170C, the headset interface 170D, the application processor, and the like, for example, music playing and audio recording.

The audio module 170 is configured to convert digital audio information into an analog audio signal for output, and is also configured to convert analog audio input into a digital audio signal. The audio module 170 may be further configured to encode and decode an audio signal.

The key 190 includes a power key, a volume key, and the like. The key 190 may be a mechanical key, or a touch-type key. The mobile phone 100 may receive key input, generate key signal input related to a user setting and function control of the mobile phone 100.

The SIM card interface 193 is configured to connect to a SIM card.

Figure 5:
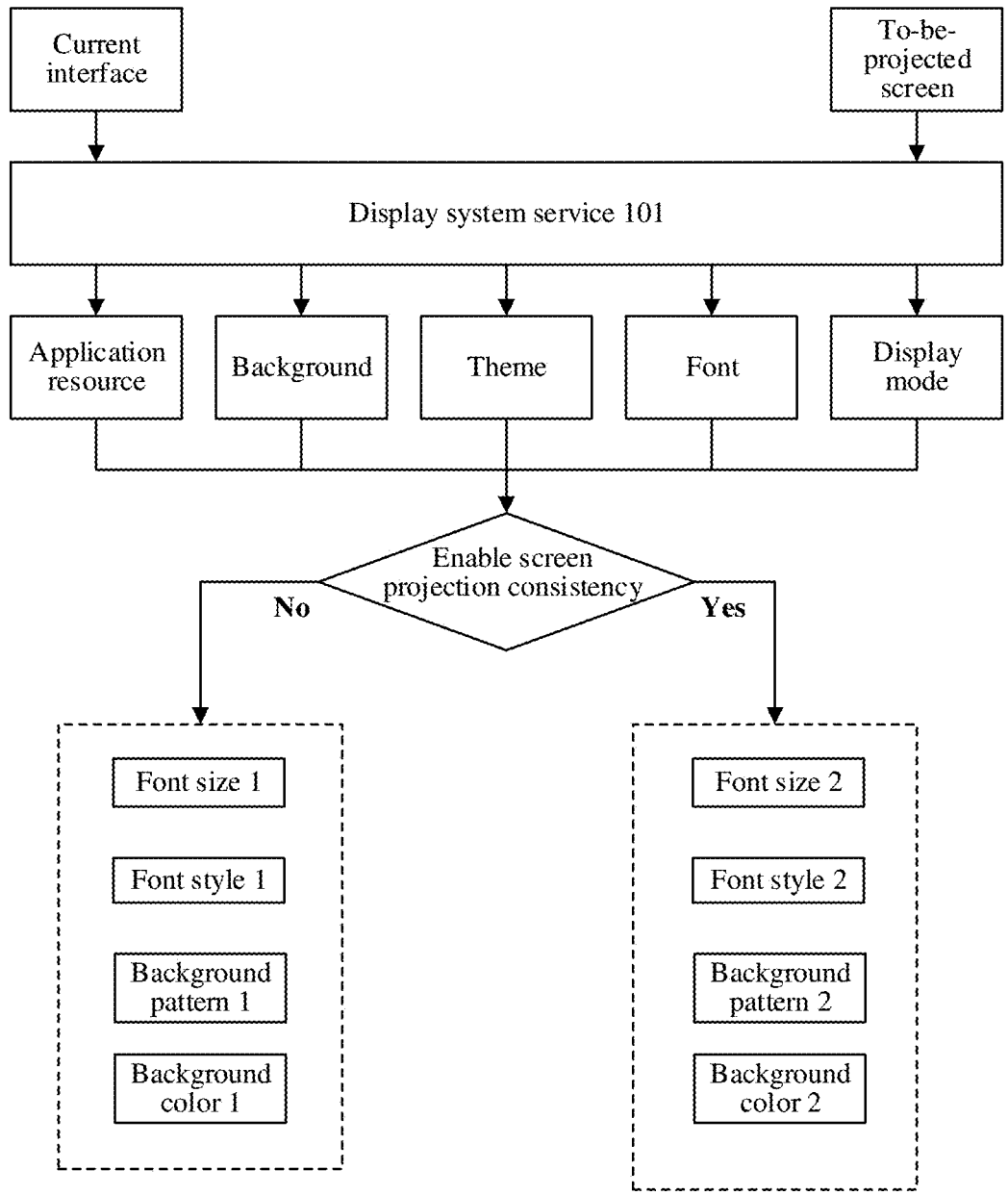
FIG. 5 shows an example of a screen coordination system on an electronic device according to an embodiment of this application.

FIG. 5 is a schematic structural diagram of a screen coordination system of a mobile phone 100.

As shown in FIG. 5, the mobile phone 100 may include a display system service 101. The display system service 101 is used to obtain display content of a view system of the mobile phone 100. The display content may be an application interface, or may be a view, for example, a view of a main interface of the mobile phone.

The display system service 101 is a program, a routine, or a process that executes a specified system function, so as to support another program, especially a bottom-layer (close to hardware) program. For example, in this embodiment of the present invention, the display system service 101 shown in FIG. 5 may be used to: manage a current display interface and a projection interface that run on the mobile phone, and set a display parameter such as a font size, a font style, a background pattern, a background color, and a control or a theme mode for the current display interface and the projection interface of the mobile phone 100. When a user opens the current display interface on the mobile phone, the display system service 101 may read the display parameter and another application resource from a memory of the mobile phone to configure the current display interface. When a consistency display mode is enabled on the mobile phone, a display style of the current display interface of the mobile phone 100 is font size 1, font style 1, background pattern 1, and background color 1. The display system service 101 may create a projection interface whose display content is the same as that of the current display interface. By using the display parameter such as font size 2, font style 2, background pattern 2, and background color 2 obtained from the tablet computer 200, the display style of the projection interface is modified.

The following describes the screen projection technical solution of this application with reference to FIG. 6A and FIG. 6B to FIG. 11c.

It may be understood that an example in which the instant messaging APP is displayed on the display interface 103 of the mobile phone 100 is used for description herein, and the instant messaging APP herein is merely exemplary. The technical solutions of this application are applicable to display interfaces of various applications including system applications on the mobile phone 100, and are not limited herein. In addition, the display interface 103 may further be a display desktop of the mobile phone 100, a drop-down menu of the mobile phone 100, an interface displayed after a left slide on the mobile phone 100, or the like.

Figure 6A:
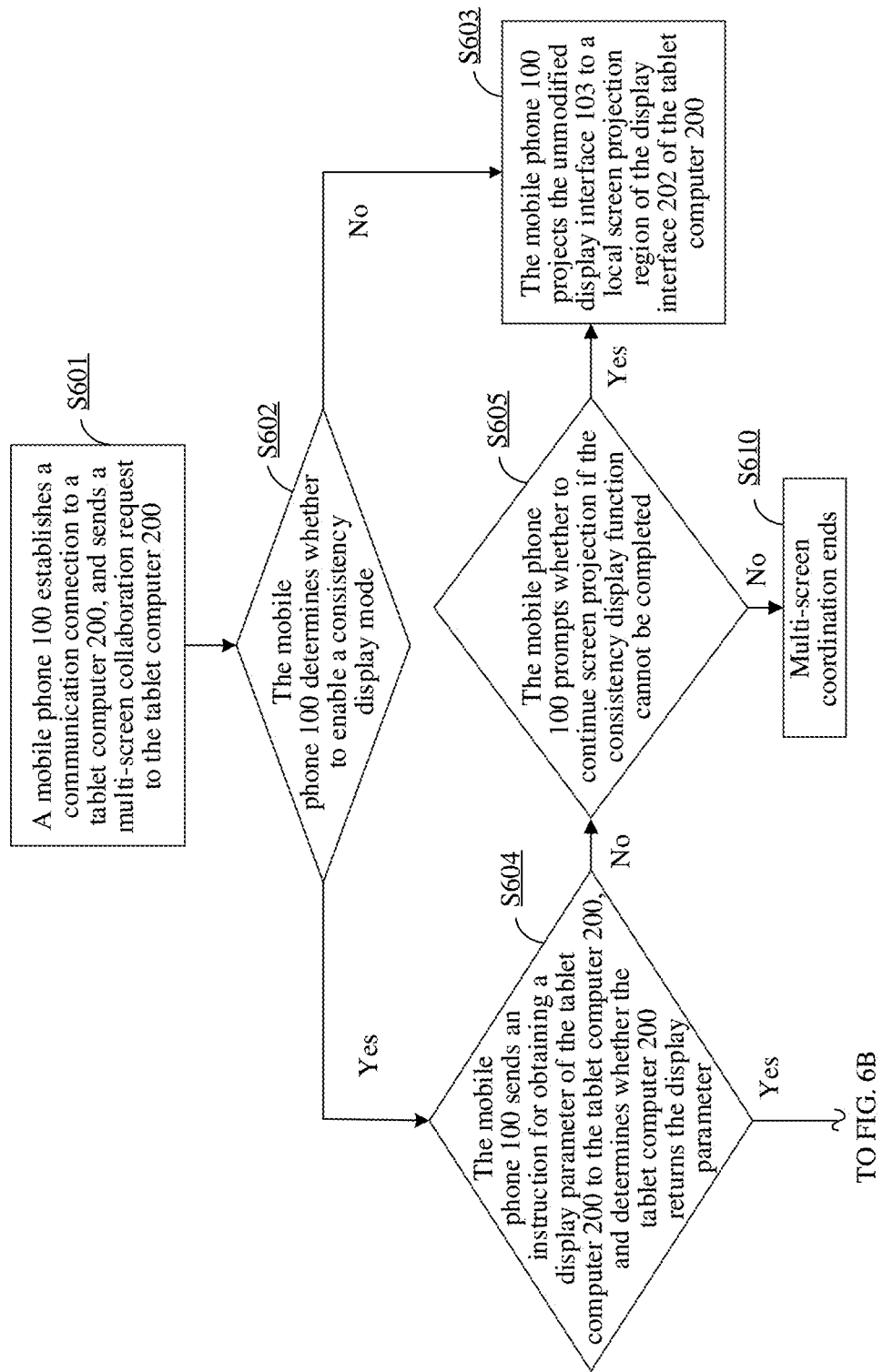
FIG. 6A and FIG. 6B are a flowchart of a method for projecting a display interface on a mobile phone to a screen of a tablet computer for multi-screen coordination display according to an embodiment of this application.
Figure 6B:
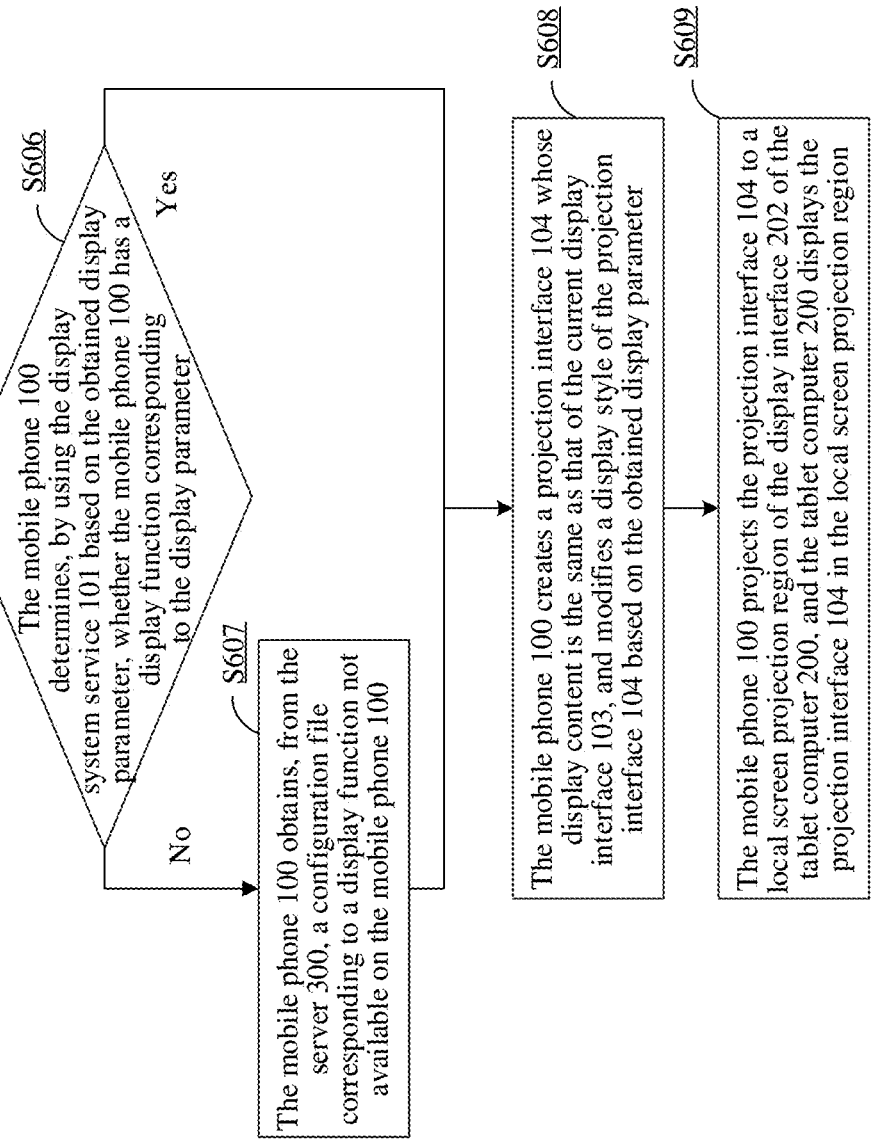

Specifically, referring to the scenarios shown in FIG. 3a-3c, as shown in FIG. 6A and FIG. 6B, a process in which the mobile phone 100 projects the current display interface 103 to the tablet computer 200 includes the following steps:

S601. The mobile phone 100 establishes a communication connection to the tablet computer 200, and sends a multi-screen collaboration request to the tablet computer 200.

For example, the mobile phone 100 may communicate with the tablet computer 200 in a wireless communication manner such as Bluetooth, Wi-Fi, or NFC. In some embodiments, the mobile phone 100 may alternatively be communicatively connected to the tablet computer 200 in a wired communication manner. For example, the mobile phone 100 is communicatively connected to the tablet computer 200 by using a data cable and a universal serial bus (Universal Serial Bus, USB) interface.

Figure 1A:
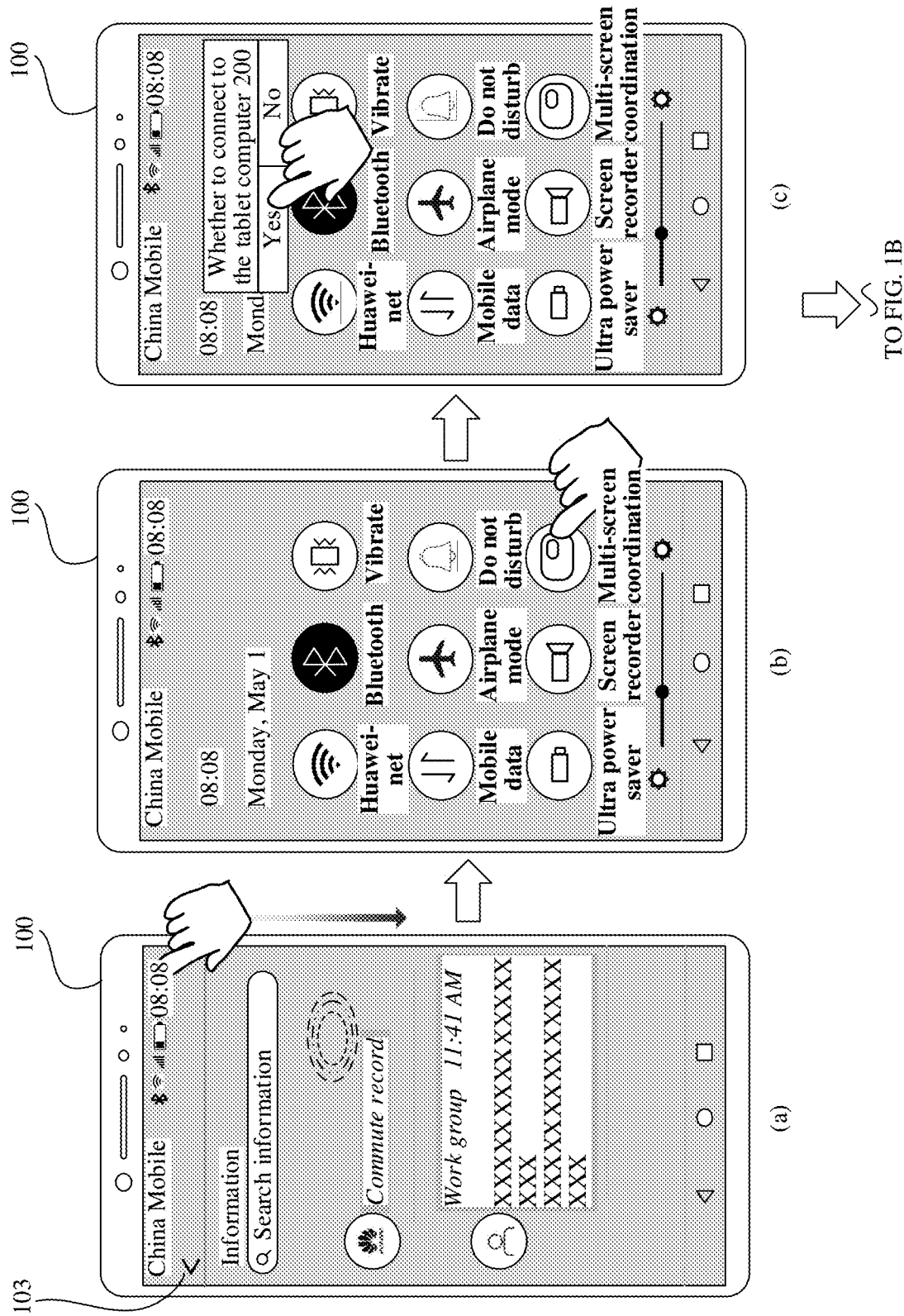
FIG. 1A and FIG. 1B show an example in the conventional technology in which a mobile phone projects a display interface of the mobile phone to a tablet computer for multi-screen coordination display.

Before or after the communication connection is established between the mobile phone 100 and the tablet computer 200, the user may enable the multi-screen coordination function of the mobile phone 100, as shown in (a) and (b) in FIG. 1A. After the user enables the multi-screen coordination display function of the mobile phone 100, the user may choose to send a multi-screen coordination display request to the tablet 200 that is communicatively connected to the mobile phone 100.

S602. The mobile phone 100 determines whether a consistency display mode is enabled. If it is enabled, the mobile phone 100 enters S604. If it is not enabled, enter S603.

The mobile phone 100 may configure a corresponding parameter for enabling/disabling the consistency display mode. For example, the mobile phone 100 configures the consistency display mode as a parameter name consistenceDisplayMode by using the display system service 101, configures a parameter value corresponding to enabling of the consistency display mode as 1, and configures a parameter value corresponding to disabling of the consistency display mode as 0, where the parameter and the parameter values are stored in the memory of the mobile phone 100. When the mobile phone 100 sends a multi-screen coordination display request to the tablet computer, the mobile phone 100 queries the parameter consistenceDisplayMode and the parameter value corresponding to the parameter. If it is found that the parameter value corresponding to the consistenceDisplayMode is 1, the mobile phone 100 determines that the consistency display mode is enabled. If it is found that the parameter value corresponding to the consistenceDisplayMode is 0, the mobile phone 100 determines that the consistency display mode is not enabled.

Figure 7:
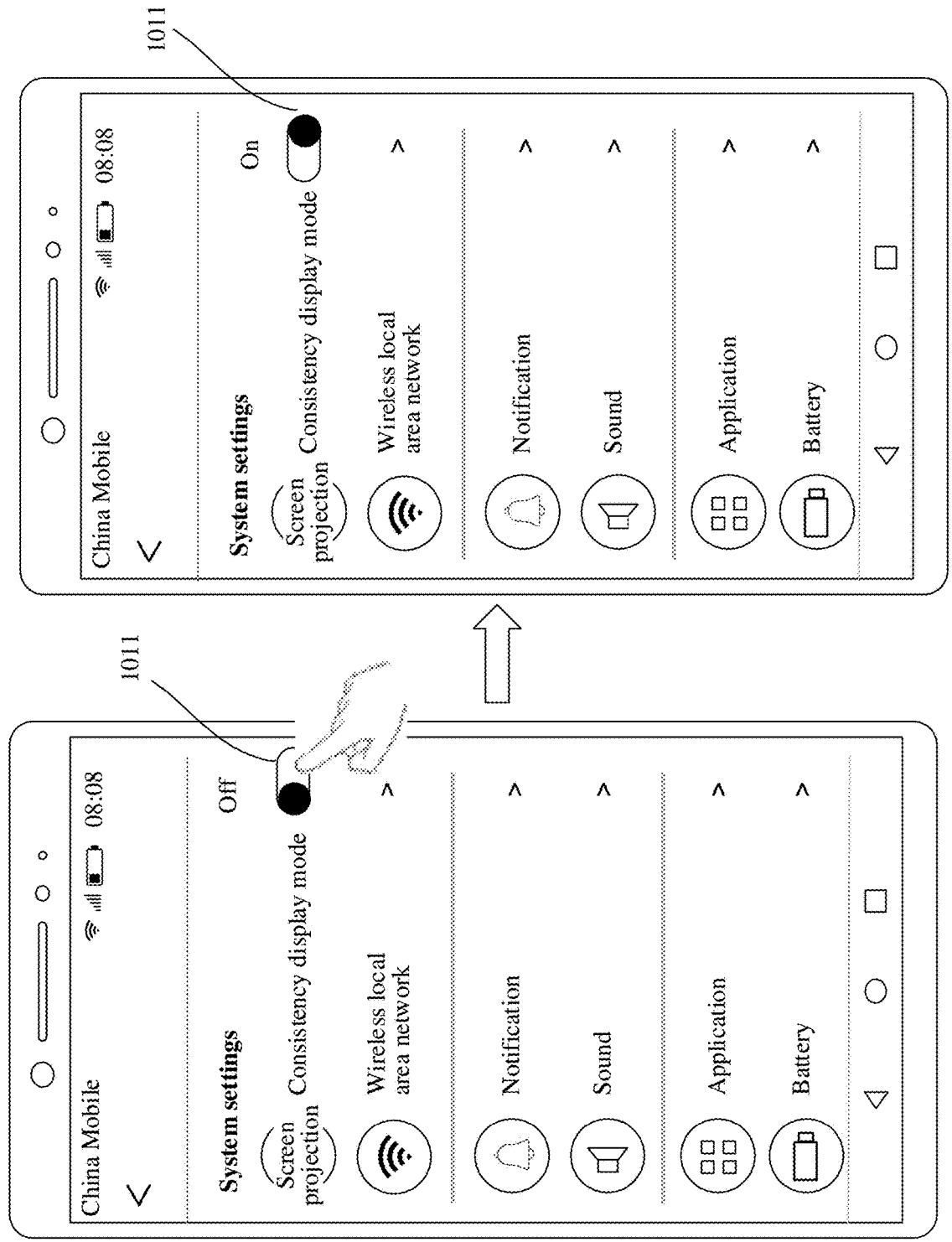
FIG. 7 shows an example in which a consistency display mode is enabled on a mobile phone according to an embodiment of this application.

In some embodiments of this application, as shown in FIG. 7, the mobile phone 100 may configure, in system settings of the mobile phone 100, an option 1011 for enabling or disabling the consistency display mode. The user may tap the enable/disable option 1011 to enable/disable the consistency display mode.

Figure 8:
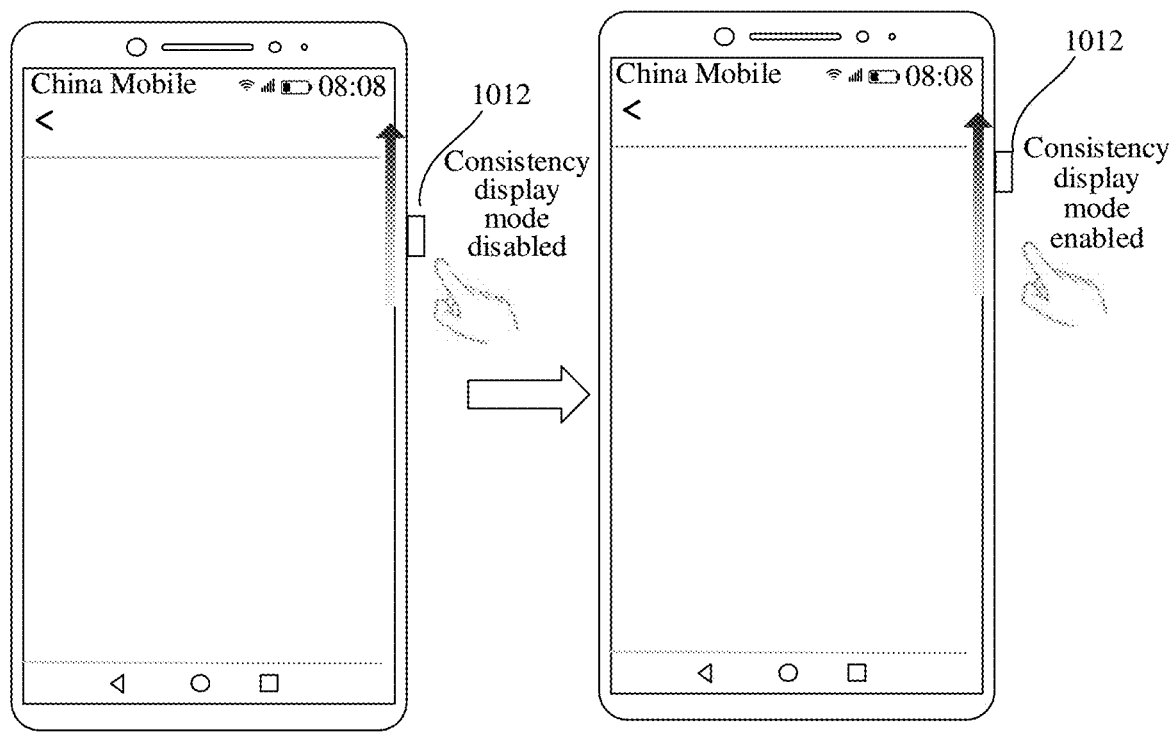
FIG. 8 shows another example in which a consistency display mode is enabled on a mobile phone according to an embodiment of this application.

In some other embodiments of this application, as shown in FIG. 8, the user may alternatively configure enabling/disabling of the consistency display mode by using a key disposed on the mobile phone 100. For example, a side key 1012 for enabling/disabling the consistency display mode is disposed on the mobile phone 100, and the user may toggle the side key 1012 to enable/disable the consistency display mode.

Figure 9:
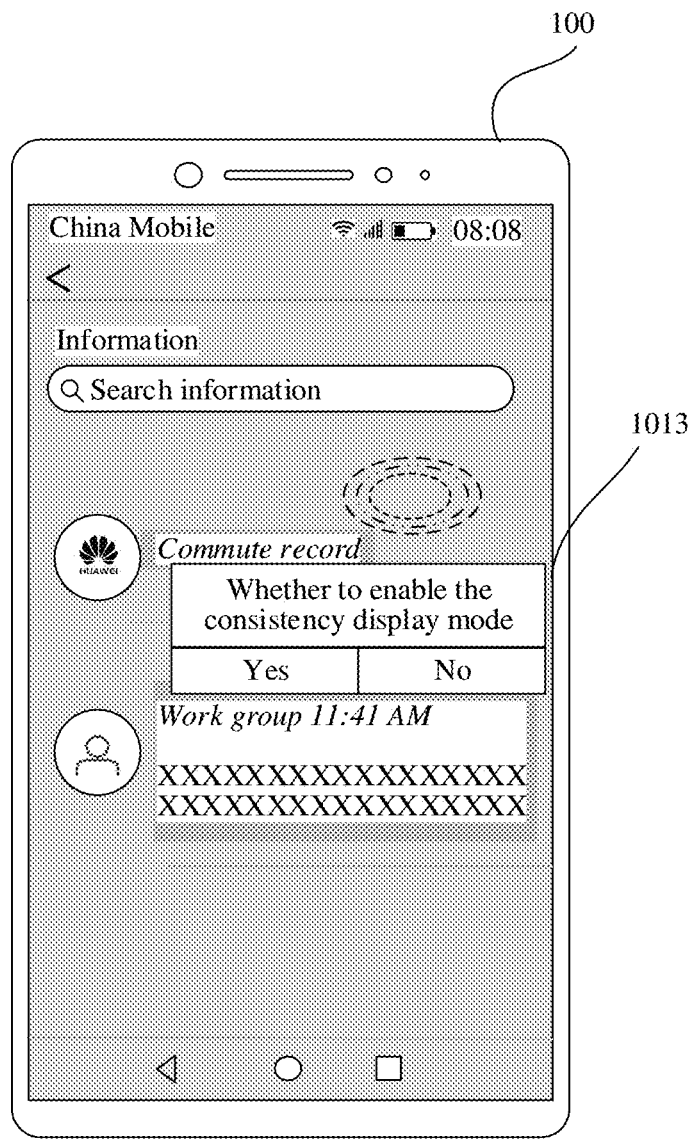
FIG. 9 shows an example of prompting, on a mobile phone, whether to enable a consistency display mode according to an embodiment of this application.

It may be understood that, when the mobile phone 100 sends a multi-screen coordination display request to the tablet computer 200, if the mobile phone 100 has not enabled the consistency display mode, the mobile phone 100 may prompt the user whether to enable the consistency display mode. After the user acknowledges that the consistency display mode is enabled, the mobile phone 100 enables the consistency display mode. For example, as shown in FIG. 9, when multi-screen coordination display is performed between the mobile phone 100 and the tablet computer 200, if the mobile phone 100 has not enabled the consistency display mode, a prompt box 1013 pops up on the screen of the mobile phone 100 to prompt the user whether to enable the consistency display mode. If the user selects yes, the mobile phone 100 enables the consistency display mode. Otherwise, the mobile phone 100 does not enable the consistency display mode.

Multi-screen collaboration is established between the mobile phone 100 and the tablet computer 200. The first electronic device 100 may obtain a display parameter of the current display interface 202 of the second electronic device 200 from the second electronic device 200. When the first electronic device determines that a display style of the display interface 103 currently displayed on the screen of the first electronic device is inconsistent with a display style of the display interface 202, the first electronic device 100 may pop up a prompt box to prompt the user whether to enable the consistency display mode.

S603. The mobile phone 100 projects the unmodified display interface 103 to a local screen projection region of the display interface 202 of the tablet computer 200.

Figure 1B:
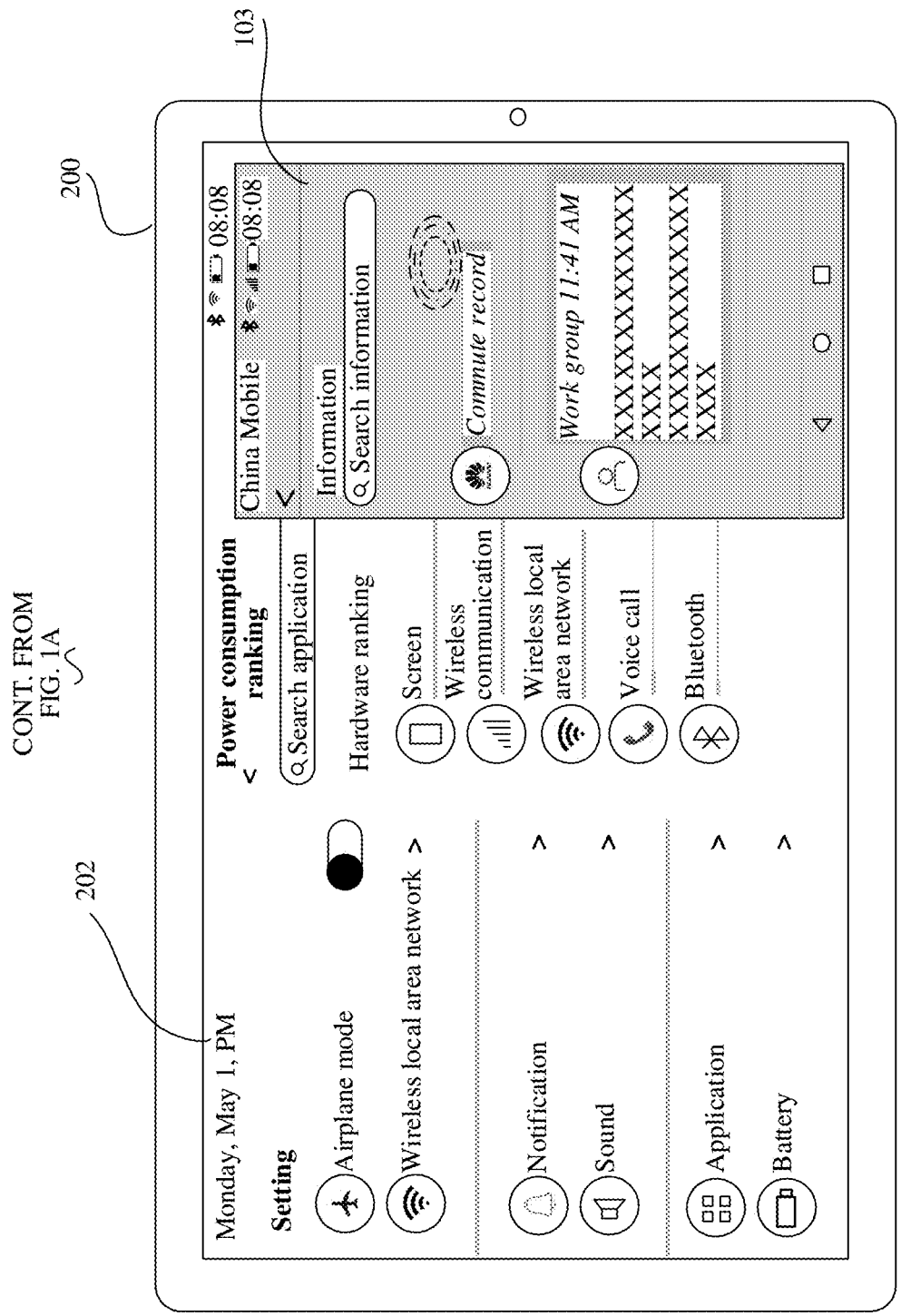

For example, as shown in FIG. 1A and FIG. 1B, the mobile phone 100 projects the display interface 103 whose display style is not modified to the local screen projection region of the display interface 202 of the tablet computer 200.

S604. The mobile phone 100 sends an instruction for obtaining a display parameter of the tablet computer 200 to the tablet computer 200, and determines whether the tablet computer 200 returns the display parameter.

If the tablet computer 200 returns the display parameter, perform S606. Otherwise, perform S605.

It may be understood that, in some embodiments, the display parameter sent by the tablet computer 200 to the mobile phone 100 may include a font size, a font style, a background pattern, a background color, a control attribute, and another specific display style parameter, for example, a background pattern: ripple, a font style: Song typeface, a font size: large, a search bar: invisible (for example, in the elderly-person mode shown in FIG. 3b, the search bar 1002 is invisible).

However, in some other embodiments, the display parameter sent by the tablet computer 200 to the mobile phone 100 may include only one identifier, and the mobile phone 100 stores a display style parameter corresponding to each identifier. For example, as shown in the following Table 1, a background pattern corresponding to identifier 1 is ripple, a font style is Song typeface, and a background color is white without shading. A font style corresponding to identifier 2 is regular script, a font size is 14, and a background color is black. A font style corresponding to identifier 3 is STXinwei.

As shown in the following Table 1, different display parameters have different types, names, and identifiers, and correspond to different parameters.

TABLE 1

| Identifier | Display style parameter |
|---|---|
| 1 | Background pattern: ripple, font style: Song typeface, background color: white without shading |
| 2 | Font style: regular script, font size: 14, background color: black |
| 3 | Font style: STXinwei |

S605. The mobile phone 100 prompts whether to continue screen projection if the consistency display function cannot be completed.

Figure 10:
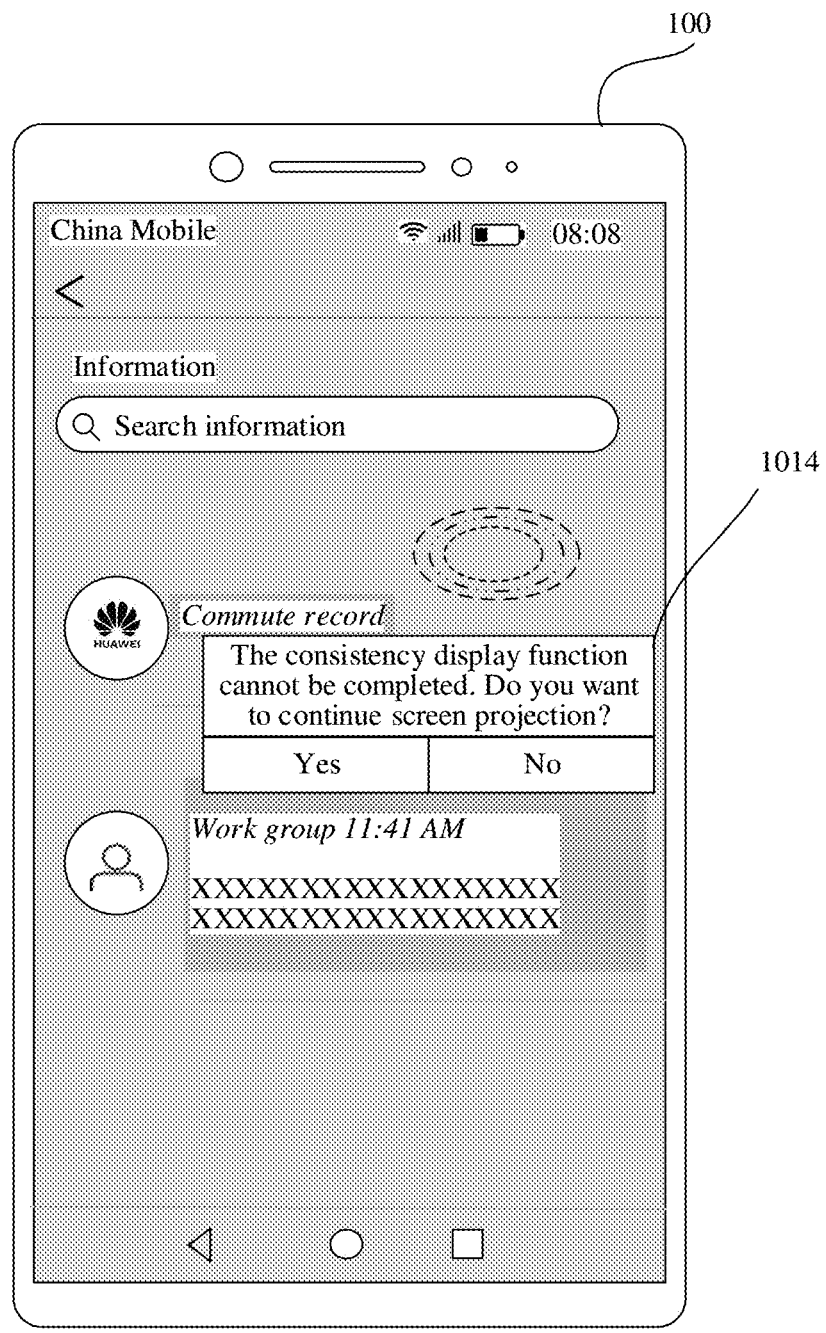
FIG. 10 shows an example of prompting, on a mobile phone, that a consistency display mode cannot be enabled according to an embodiment of this application.

For example, as shown in FIG. 10, after the mobile phone 100 sends an instruction for obtaining the display parameter of the tablet computer 200 to the tablet computer 200, if the mobile phone 100 does not receive the display parameter returned by the tablet computer 200, in this case, a prompt box 1014 may pop up on the screen of the mobile phone 100 to prompt the user whether to continue to perform multi-screen coordination display while the consistency display function cannot be completed. If the user selects yes, perform S603. The mobile phone 100 projects the display interface 103 whose display style is not modified to the tablet computer 200. If the user selects no, the mobile phone 100 ends screen projection, that is, ends the operation of projecting the display interface 103 to the tablet computer 200, and prompts the user that multi-screen coordination display ends, that is, performs S610 to end multi-screen coordination display.

It may be understood that, in some other embodiments, if the user selects no, the mobile phone 100 may further repeatedly perform S604, and the mobile phone 100 may again send an instruction for obtaining the display parameter of the tablet computer 200 to the tablet computer 200.

In addition, it may be understood that, in some other embodiments, after establishing a communication connection to the tablet computer 200, the mobile phone 100 may send an instruction for obtaining the display parameter to the tablet computer 200. The mobile phone 100 does not need to send the obtaining instruction until the consistency display mode is enabled.

In addition, it may be further understood that, in some other embodiments, after the mobile phone 100 is communicatively connected to the tablet computer 200, the tablet computer 200 may actively send a display parameter to the mobile phone 100, and the mobile phone 100 does not need to send an instruction for obtaining the display parameter to the tablet computer 200.

S606. The mobile phone 100 determines, by using the display system service 101 based on the obtained display parameter, whether the mobile phone 100 has a display function corresponding to the display parameter.

If the mobile phone has these functions, the mobile phone creates a display-style-modified projection interface 104 to enter S608. If some display functions are not available, configuration files corresponding to the display functions need to be downloaded from the server to enter S607.

For example, after obtaining the display parameter, the mobile phone 100 may search, by using the display system service 101, the memory of the mobile phone 100 for a configuration file of a display function corresponding to the display parameter. For example, if the display parameter obtained by the mobile phone 100 from the tablet computer 200 includes a background pattern "ripple", the display system service 101 of the mobile phone 100 may search the memory of the mobile phone 100 for a configuration file of the background pattern "ripple".

S607. The mobile phone 100 obtains, from the server 300, a configuration file corresponding to a display function not available on the mobile phone 100.

For example, if the display parameter received by the mobile phone 100 includes the following display style parameters: a background pattern "ripple" and a font "STXinwei", where the memory of the mobile phone 100 does not store the font "STXinwei", the mobile phone 100 may send an obtaining request to the server 300, and receive a configuration file of the font "STXinwei" from the server 300, so as to be used in subsequent processing.

S608. The mobile phone 100 creates a projection interface 104 whose display content is the same as that of the current display interface 103, and modifies a display style of the projection interface 104 based on the obtained display parameter.

It may be understood that the mobile phone 100 may create the projection interface 104 in various manners. For example, the mobile phone 100 may generate the projection interface 104 in a form of creating an invisible view (View), creating a virtual screen, or picture-in-picture. When the projection interface 104 is created, display content of the instant messaging APP on the projection interface is enabled to be consistent with that of the instant messaging APP on the current display interface 103 of the mobile phone 100. Specific technical details of creating the projection interface 104 and modifying the display style are described in detail below.

S609. The mobile phone 100 projects the projection interface 104 to a local screen projection region of the display interface 202 of the tablet computer 200, and the tablet computer 200 displays the projection interface 104 in the local screen projection region.

In S601 to S608, the request sent/returned between the mobile phone 100 and the tablet computer 200 and between the mobile phone 100 and the server 300 may be a socket request (socket request). The socket request is used to perform bidirectional communication between different electronic devices and between applications of different electronic devices in a wireless network or a wired network.

The following describes several manners of creating the projection interface 104 in S608.

Manner 1: Generate a Projection Interface by Creating an Invisible View

The projection interface 104 herein may be an invisible view of the current display interface 103 created by the mobile phone 100 by using the display system service 101. The mobile phone 100 sets the projection interface 104 to be invisible. After creation, display content of the projection interface 104 is consistent with display content of the current display interface 103 of the mobile phone 100. Then, the mobile phone 100 modifies the display style of the projection interface 104 based on the obtained display parameter of the tablet computer 200 by using the display system service 101. For example, the mobile phone 100 modifies, by using the display system service 101, display parameters such as a font size, a font style, a background pattern, a background color, a control attribute, or a theme mode of the instant messaging APP in the projection interface 104.

Figure 11A:
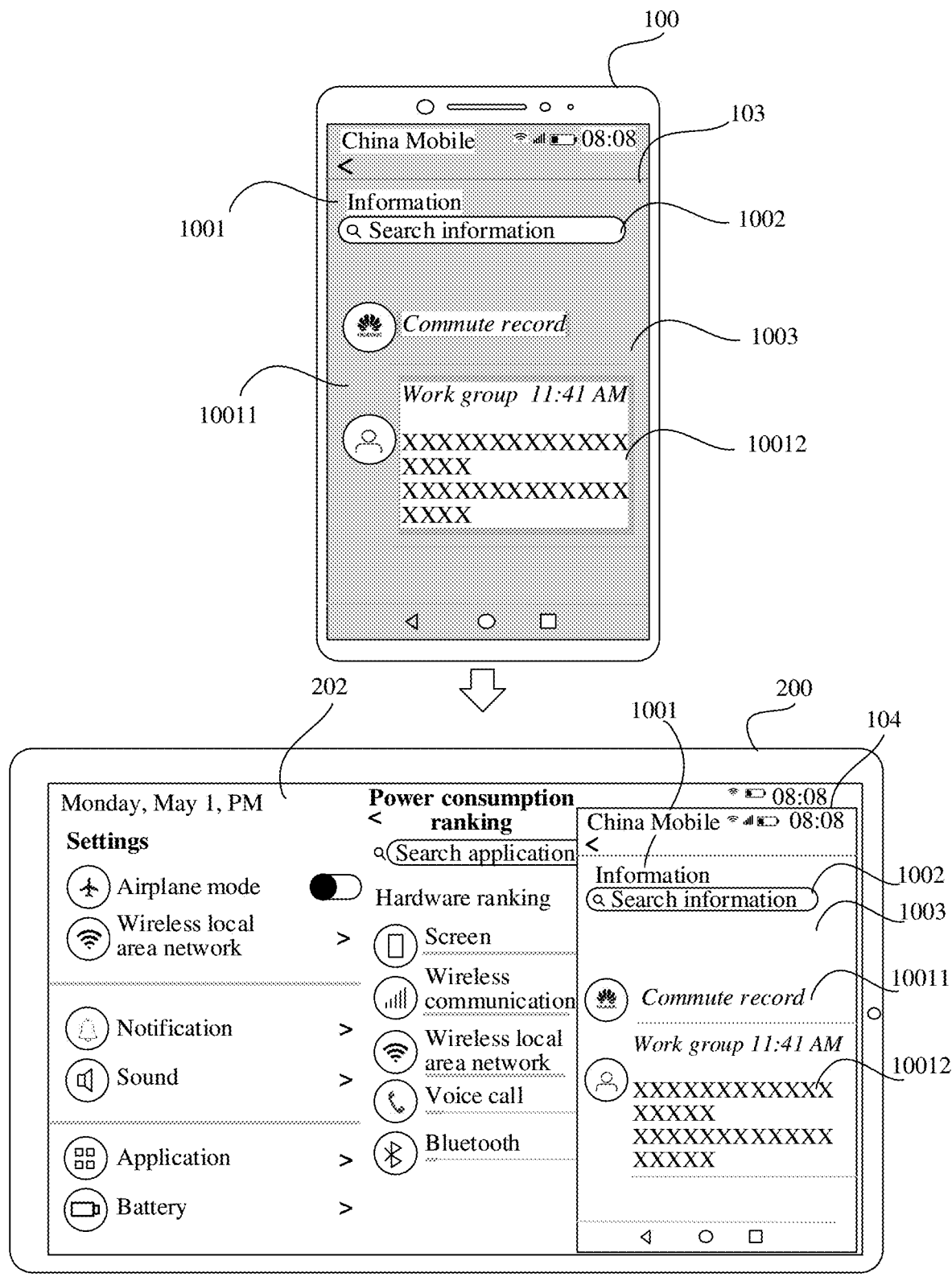
FIG. 11a shows an example in which a background color of a display interface of a mobile phone is consistent with a background color of a display interface of a tablet computer after screen projection to the tablet computer according to an embodiment of this application.
Figure 11B:
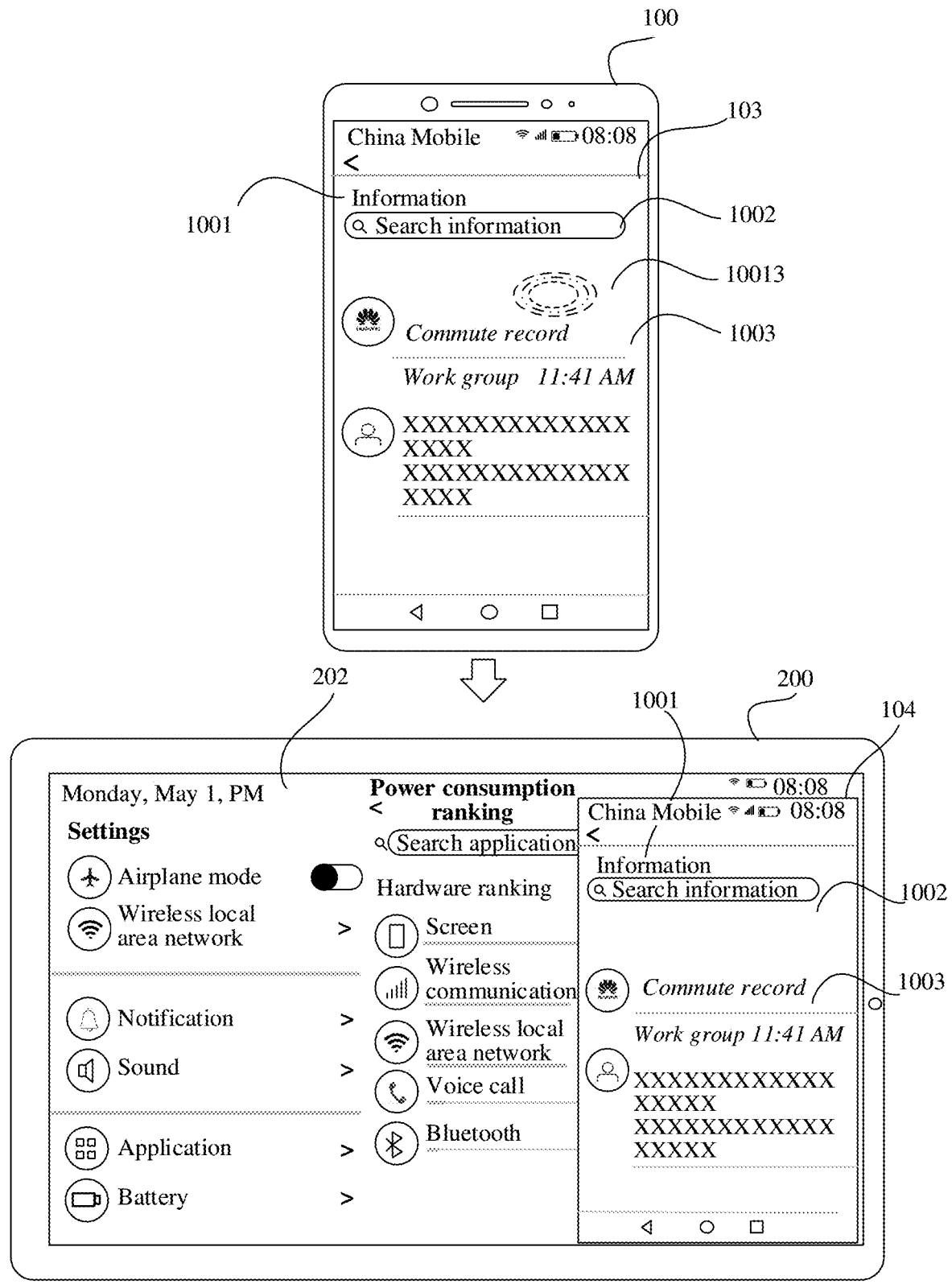
FIG. 11b shows an example in which a background pattern of a display interface of a mobile phone is consistent with a background pattern of a display interface of a tablet computer after screen projection to the tablet computer according to an embodiment of this application.
Figure 11C:
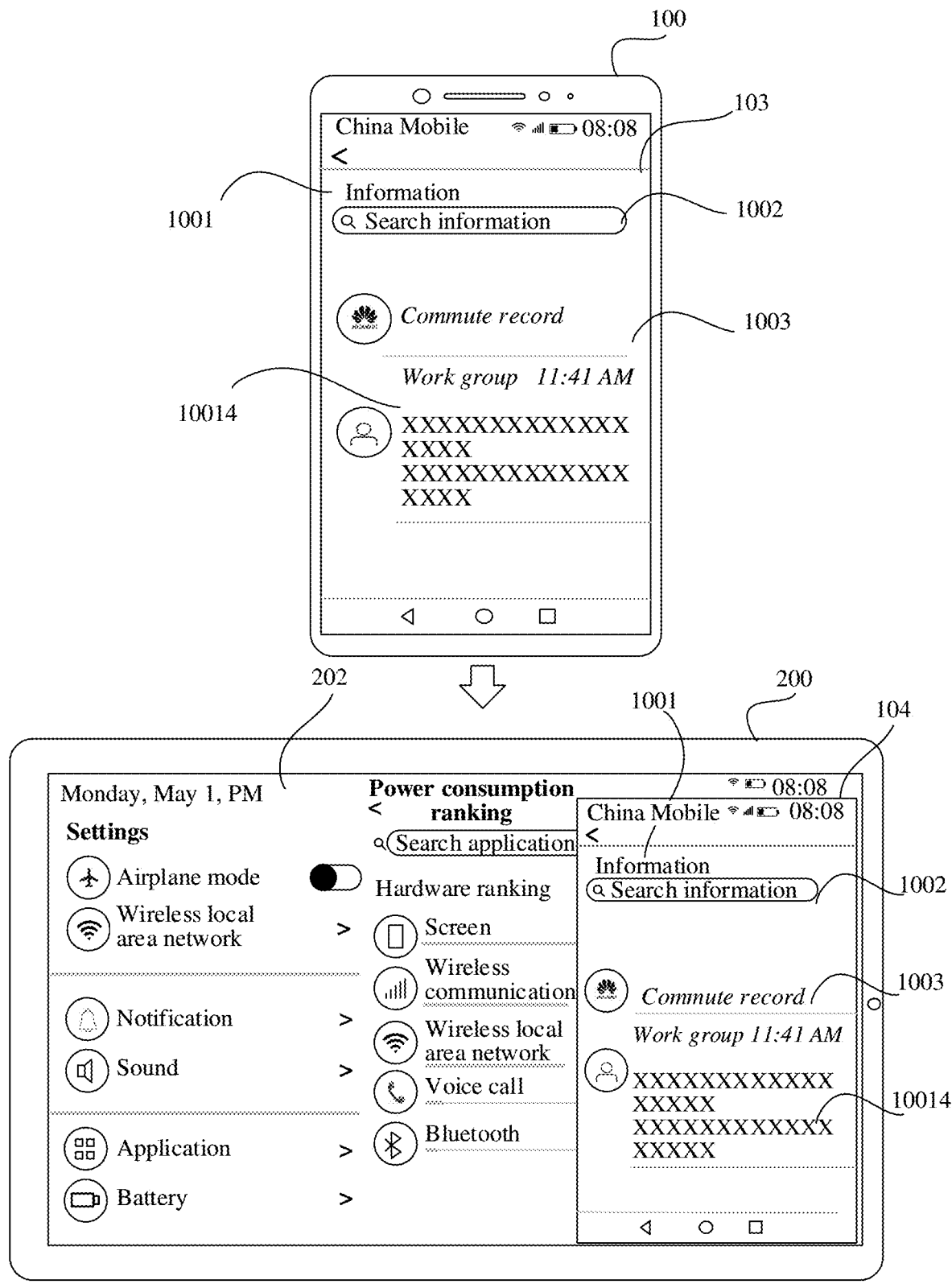
FIG. 11c shows an example in which a font style of a display interface of a mobile phone is consistent with a font style of a display interface of a tablet computer after screen projection to the tablet computer according to an embodiment of this application.

FIG. 11*a* to FIG. 11*c* describe specific technical details in which when the consistency display mode is enabled, the mobile phone 100 creates an invisible view of the current display interface 103 of the mobile phone 100 to obtain the projection interface 104, and modifies the display style of the projection interface 104 based on the current display style of the tablet computer 200.

As shown in FIG. 11*a*, the instant messaging APP displayed on the current display interface 103 of the mobile phone 100 includes a plurality of controls, for example, a title bar 1001, a search bar 1002, and a communication column 1003. The communication column 1003 displays two communication objects, which are respectively "commute record" and "work group". Each communication object further includes an object icon and communication content. In FIG. 11*a*, a background color 10011 of the instant messaging APP is set to light gray, and a background color 10012 of communication content of each communication object in the communication column 1003 is set to dark gray.

The mobile phone 100 obtains the display parameter from the tablet computer 200, where the display parameter includes: a background color is white. The mobile phone 100 creates the projection interface 104 that is the same as the display interface 103, and modifies the background color 10011 of the instant messaging APP in the projection interface 104 and the background color 10012 of the communication content part of the communication object in the communication column 1003 to white. Finally, the mobile phone 100 projects the display-style-modified projection interface 104 to the display interface 202 of the tablet computer 200.

Referring to FIG. 11*b*, in addition to the title bar 1001, the search bar 1002, and the communication column 1003, the instant messaging APP displayed on the current display interface 103 of the mobile phone 100 further sets a background pattern 10013 of "ripple". The mobile phone 100 obtains the display parameter from the tablet computer 200, where the display parameter includes: a background pattern is a default background pattern. The mobile phone 100 creates the projection interface 104 that is the same as the display interface 103, modifies the background pattern in the instant messaging APP in the projection interface 104 to the default background pattern, that is, removes the "ripple" background pattern 10013, and then projects the display-style-modified projection interface 104 to the display interface 202 of the tablet computer 200.

Finally, referring to FIG. 11*c*, different from FIG. 11*a* and FIG. 11*b*, in FIG. 11*c*, the instant messaging APP displayed on the current display interface 103 of the mobile phone 100 includes a title bar 1001, a search bar 1002, and a communication column 1003, where a font style 10014 of a character is regular script, and a font style of the tablet computer 200 is Song typeface. Therefore, after the mobile phone 100 modifies the font style 10014 of the character in the created projection interface 104 to Song typeface, the mobile phone 100 projects the display-style-modified projection interface 104 to the display interface 202 of the tablet computer 200.

Manner 2: Create a Projection Interface by Using a Virtual Screen

In some other embodiments, the mobile phone 100 may create, on a virtual screen, a projection interface 104 that has the same display content as the current display interface 103, and project the display-style-modified projection interface 104 to the display interface 202 of the tablet computer 200.

For example, the mobile phone 100 may create a virtual screen. The mobile phone 100 creates and modifies the projection interface 104 based on the display parameter such as a font size, a font style, a font color, an icon size, an icon color, a background pattern, a background color, and a control attribute obtained from the tablet computer 200, and displays the projection interface 104 on the virtual screen. A screen size, resolution, and pixel density of the virtual screen may be the same as those of the current display interface 103 of the mobile phone 100. For example, in an Android system, the mobile phone 100 may create a virtual screen by using a createVirtualDisplay (String, int, int, int, int, Surface, int) of the Android system display system service DisplayManager by using a screen size, resolution, pixel density, and the like of the current display interface 103 as parameters. In addition, in some embodiments, in order not to affect the display interface 103 on the mobile phone 100, the virtual screen may be set to be invisible to the user. In some other embodiments, to enable the user to determine whether a modified style of the display interface meets a requirement of the user, the virtual screen may be set to be visible to the user. After the user acknowledges the modification, the projection interface 104 is sent to the tablet computer 200.

Manner 3: Create a Projection Interface in a Picture-In-Picture Manner

Figure 12:
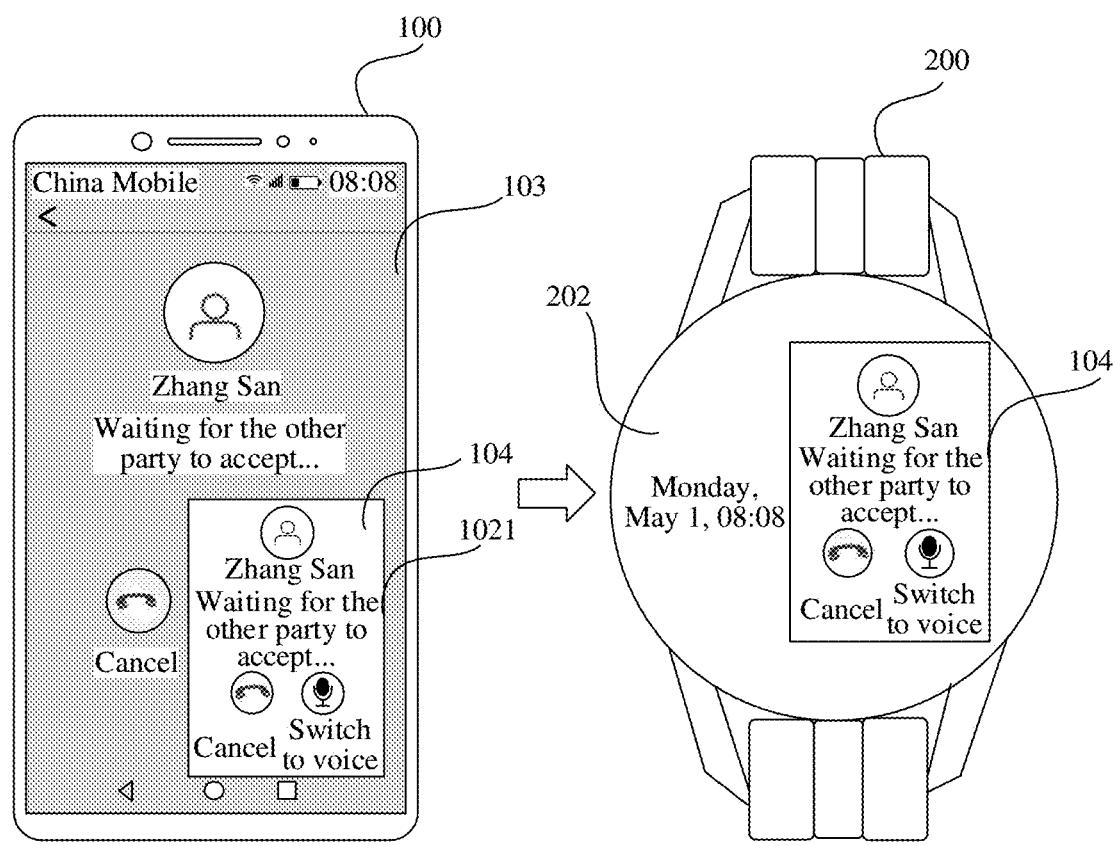
FIG. 12 shows an example in which screen projection between electronic devices is performed in a picture-in-picture manner according to an embodiment of this application.

In addition to the foregoing forms of creating the projection interface 104 by creating an invisible view and a virtual screen, as shown in FIG. 12, a window 1021 may be created in a picture-in-picture manner in the mobile phone 100, and the display-style-modified projection interface 104 is displayed in the window 1021. The window 1021 is displayed simultaneously with the original display interface 103, and then the newly created window 1021 is projected to the display interface 202 of the smartwatch 200.

In the foregoing embodiment in which the mobile phone 100 is projected to the tablet computer 200, the size of the local screen projection region of the tablet computer 200 that is used to receive screen projection is greater than or equal to the size of the screen of the mobile phone 100, and differently, as shown in FIG. 3d, a scenario in which an electronic device (for example, the mobile phone 100) with a relatively large screen size is projected to an electronic device (for example, a smartwatch) with a relatively small screen size exists.

Figure 13A:
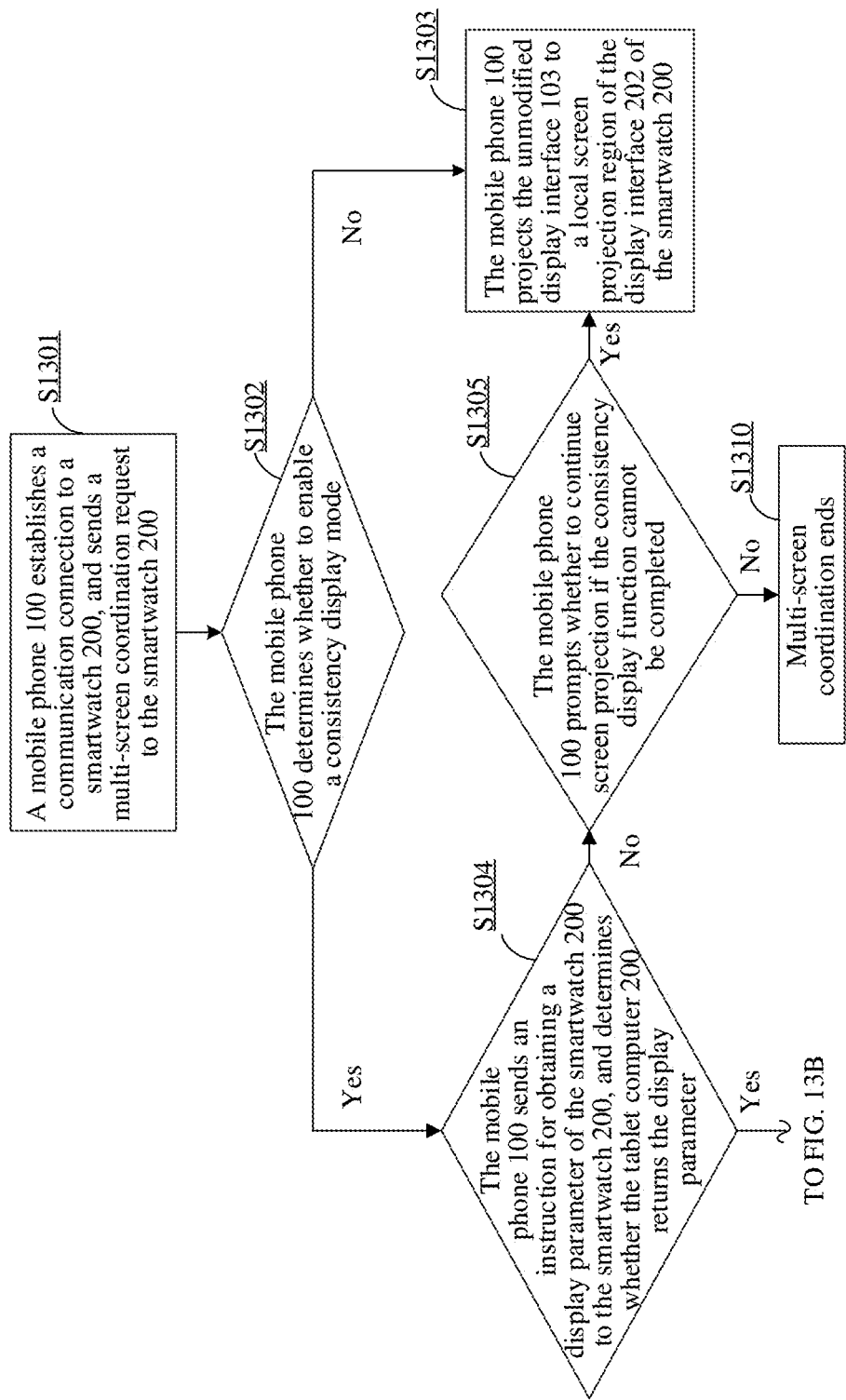
FIG. 13A and FIG. 13B are a flowchart of a method for projecting a display interface on a mobile phone to a screen of smartwatch for multi-screen coordination display according to an embodiment of this application.
Figure 13B:
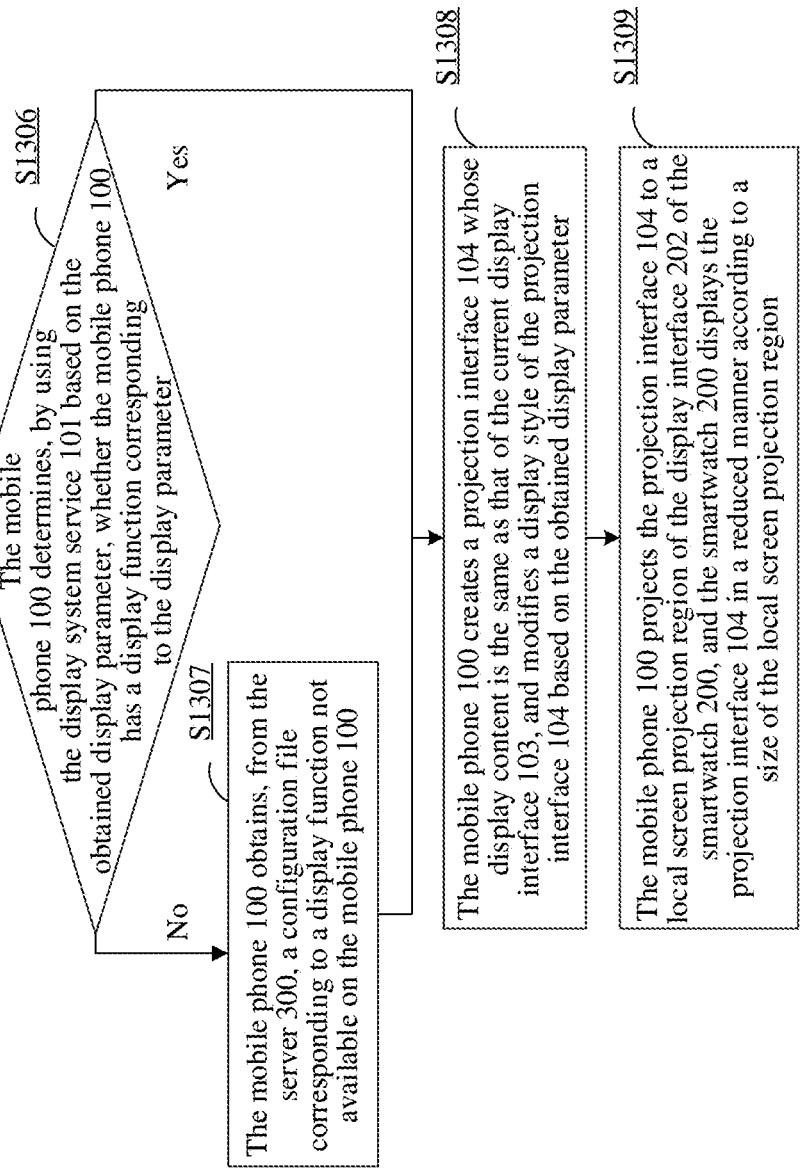

FIG. 13A and FIG. 13B shows that, the mobile phone 100 and the smartwatch 200 implement a multi-screen coordination display function in the scenario shown in FIG. 3d. Specifically, as shown in FIG. 13A and FIG. 13B, the method includes the following steps.

S1301. The mobile phone 100 establishes a communication connection to the smartwatch 200, and sends a multi-screen coordination request to the smartwatch 200.

S1302. The mobile phone 100 determines whether a consistency display mode is enabled. If it is enabled, the mobile phone 100 enters S1304. If it is not enabled, enter S1303.

S1303. The mobile phone 100 projects the unmodified display interface 103 to a local screen projection region of the display interface 202 of the smartwatch 200.

S1304. The mobile phone 100 sends an instruction for obtaining a display parameter of the smartwatch 200 to the smartwatch 200, and determines whether the tablet computer 200 returns the display parameter.

S1305: The mobile phone 100 prompts whether to continue screen projection if the consistency display function cannot be completed. If the user selects no, the mobile phone 100 ends screen projection, that is, ends the operation of projecting the display interface 103 to the smartwatch 200, and prompts the user that multi-screen coordination display ends, that is, performs S1310 to end multi-screen coordination display.

S1306. The mobile phone 100 determines, by using the display system service 101 based on the obtained display parameter, whether the mobile phone 100 has a display function corresponding to the display parameter. If the mobile phone has these display functions, the mobile phone creates a display-style-modified projection interface 104 to enter S1308. If some display functions are not available, configuration files corresponding to the display functions need to be downloaded from the server to enter S1307.

S1307. The mobile phone 100 obtains, from the server 300, a configuration file corresponding to a display function not available on the mobile phone 100.

S1301 to S1307 are the same as S601 to S607 described in FIG. 6A and FIG. 6B. Details are not described herein again.

S1308. The mobile phone 100 creates a projection interface 104 whose display content is the same as that of the current display interface 103, and modifies a display style of the projection interface 104 based on the obtained display parameter.

For example, a font style of the display interface 103 of the mobile phone 100 is regular script, and the display parameter returned by the smartwatch 200 includes a font style Song typeface, and the mobile phone 100 modifies the font style of the projection interface 104 to regular script. In some other embodiments, the display parameter may further include another display style parameter such as a font size, a font style, a background pattern, a background color, and a control. For a specific process herein, references may be made to the foregoing modification of the display style and creation of the projection interface.

S1309. The mobile phone 100 projects the projection interface 104 to a local screen projection region of the display interface 202 of the smartwatch 200, and the smartwatch 200 displays the projection interface 104 in a reduced manner according to a size of the local screen projection region.

For example, a screen width and height of the smartwatch 200 are respectively 100 and 200, the size of the local screen projection region in the screen of the smartwatch 200 is 50 in width and 100 in height, and a width and a height of the mobile phone 100 are respectively 200 and 400. After the mobile phone 100 projects the projection interface 104 to the local screen projection region of the display interface 202 of the smartwatch 200, the width and the height of the projection interface 104 may be scaled to 50 and 100 according to the width and the height of the local screen projection region of the display interface 202 of the smartwatch 200.

That the smartwatch 200 displays the projection interface 104 in a reduced manner according to the size of the local screen projection region as described in S1309 may be completed at the mobile phone 100. For example, when the mobile phone 100 obtains the display parameter from the smartwatch 200, the mobile phone 100 may further simultaneously obtain the size of the local screen projection region of the display interface 202 of the smartwatch 200. Then, the mobile phone 100 may create a projection interface 104 that has a same size as the local screen projection region of the smartwatch 200. After the display style of the projection interface 104 is modified, the projection interface 104 that has a same size as the local screen projection region of the smartwatch 200 is projected to the smartwatch 200.

It may be understood that in another embodiment, in addition to reducing the projection interface 104 and then projecting it to the second electronic device 200, the mobile phone 100 may further enlarge the projection interface 104 and then project it.

For example, when the second electronic device 200 is a smart television 200, a screen width and height of the smart television 200 are 1500 and 1000 respectively, a size of a local screen projection region in the screen of the smart television 200 is 300 in width and 600 in height, and the width and the height of the mobile phone 100 are 200 and 400 respectively. After the mobile phone 100 projects the projection interface 104 to the screen of the smart television 200, the width and the height of the projection interface 104 may be scaled to 300 and 600 according to the width and the height of the local screen projection region in the screen of the smart television 200.

In addition, the mobile phone 100 may further project the display interface 103 to a plurality of second electronic devices 200. In this case, the mobile phone 100 creates a plurality of projection interfaces for the display interface 103, and separately projects the plurality of projection interfaces to the plurality of second electronic devices 200. To distinguish between the plurality of projection interfaces, when the projection interfaces are created, the mobile phone 100 configures one projection interface Id (Display Id) for each projection interface. In this way, the mobile phone 100 searches for and manages the projection interfaces by using the projection interface IDs of the projection interfaces when the mobile phone 100 performs screen projection on the plurality of second electronic devices 200.

Figure 14A:
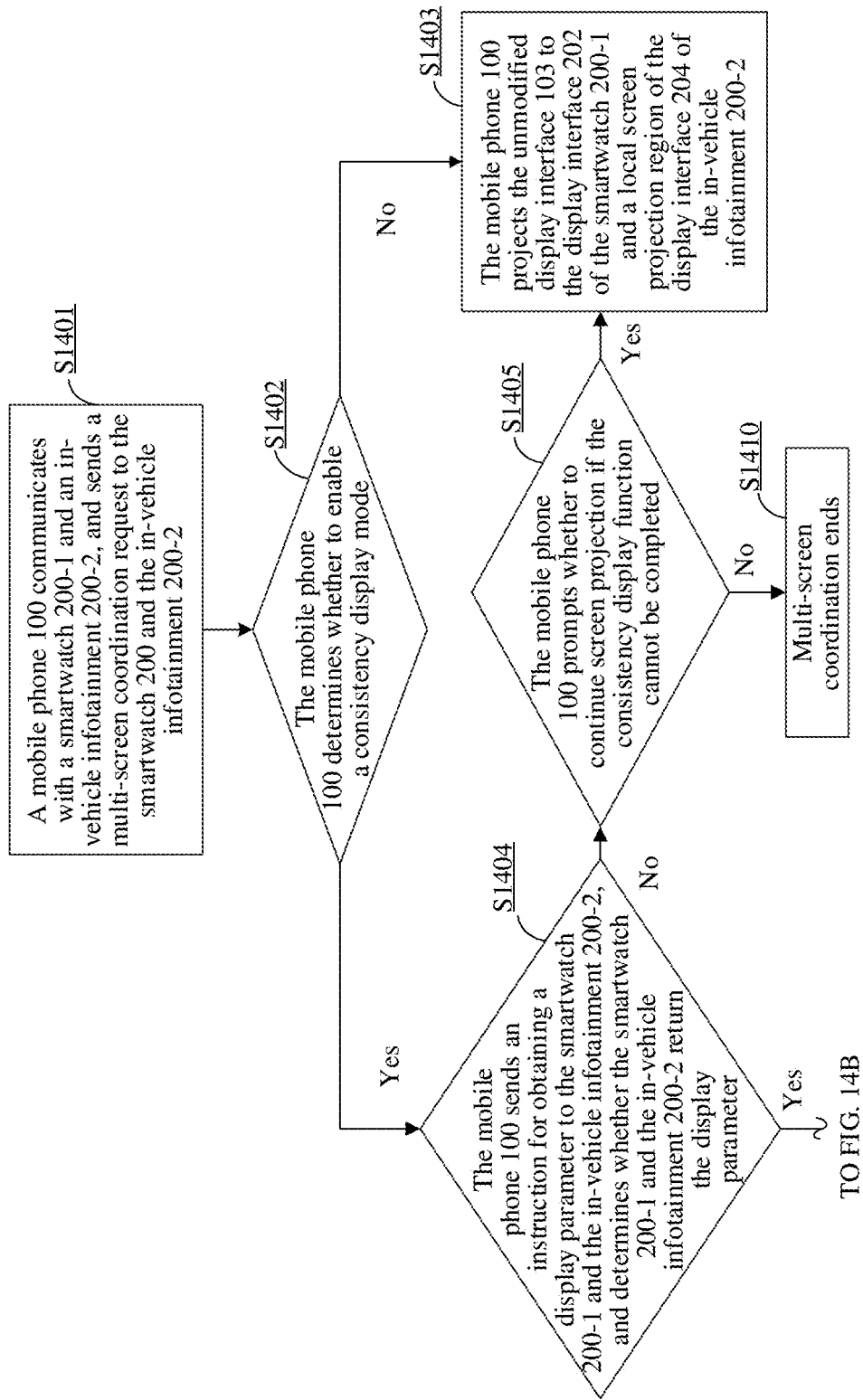
FIG. 14A and FIG. 14B are a flowchart of a method for simultaneously projecting a display interface on a mobile phone to a screen of a smartwatch and a screen of an in-Vehicle infotainment to perform multi-screen coordination display according to an embodiment of this application.
Figure 14B:
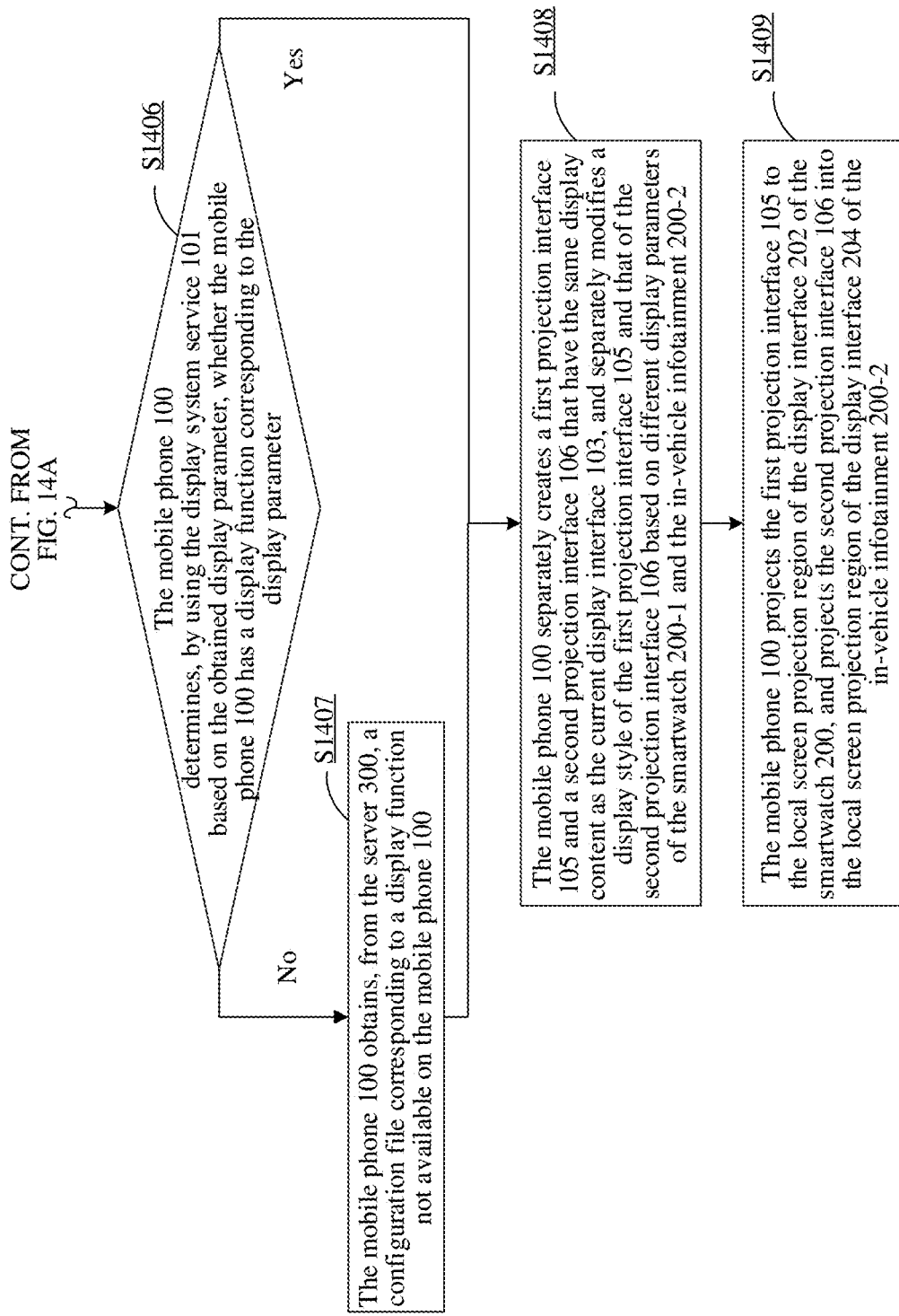

Referring to FIG. 3e, the following describes a process in which the mobile phone 100 projects the display interface 103 to the smartwatch 200-1 and the in-vehicle infotainment 200-2. A difference from the process described in FIG. 6A and FIG. 6B lies in that the mobile phone 100 needs to simultaneously create the first projection interface 105 and the second projection interface 106 of the display interface 103. As shown in FIG. 14A and FIG. 14B, the method specifically includes the following steps.

S1401. The mobile phone 100 communicates with the smartwatch 200-1 and the in-vehicle infotainment 200-2, and sends a multi-screen coordination request to the smartwatch 200 and the in-vehicle infotainment 200-2.

S1402. The mobile phone 100 determines whether a consistency display mode is enabled. If it is enabled, the mobile phone 100 enters S1404. If it is not enabled, enter S1403.

S1403. The mobile phone 100 projects the unmodified display interface 103 to the display interface 202 of the smartwatch 200-1 and a local screen projection region of the display interface 204 of the in-vehicle infotainment 200-2.

S1404. The mobile phone 100 sends an instruction for obtaining a display parameter to the smartwatch 200-1 and the in-vehicle infotainment 200-2, and determines whether the smartwatch 200-1 and the in-vehicle infotainment 200-2 return the display parameter.

S1405: The mobile phone 100 prompts whether to continue screen projection if the consistency display function cannot be completed. If the user selects no, the mobile phone 100 ends screen projection, that is, ends the operation of projecting the display interface 103 to the smartwatch 200-1 and the in-vehicle infotainment 200-2, and prompts the user that multi-screen coordination display ends, that is, performs S1410 to end multi-screen coordination display.

S1406. The mobile phone 100 determines, by using the display system service 101 based on the obtained display parameter, whether the mobile phone 100 has a display function corresponding to the display parameter. If the mobile phone has these functions, the mobile phone creates a display-style-modified first projection interface 105 and second projection interface 106 to enter S1408. If some display functions are not available, configuration files corresponding to the display functions need to be downloaded from the server to enter S1407.

S1407. The mobile phone 100 obtains, from the server 300, a configuration file corresponding to a display function not available on the mobile phone 100.

S1401 to S1407 are the same as S6oi to S607 described in FIG. 6A and FIG. 6B. Details are not described herein again.

S1408. The mobile phone 100 separately creates a first projection interface 105 and a second projection interface 106 that have the same display content as the current display interface 103, and separately modifies a display style of the first projection interface 105 and that of the second projection interface 106 based on different display parameters of the smartwatch 200-1 and the in-vehicle infotainment 200-2.

For example, the display parameters of the smartwatch 200-1 and the in-vehicle infotainment 200-2 may be as follows: A background color is white, a font style is Song typeface, and in this case, a display style of the display interface 103 of the mobile phone 100 is: A background color is gray and a font style is regular script, the mobile phone 100 separately creates the first projection interface 105 and the second projection interface 106 by using the display system service 101, the first projection interface 105 is configured to be projected to the smartwatch 200-1, and the second projection interface 106 is configured to be projected to the in-vehicle infotainment 200-2. The mobile phone 100 collectively modifies, by using the display system service 101, the display style of the first projection interface 105 and that of the second projection interface 106 to that a background color is white, and a font style is Song typeface.

S1409. The mobile phone 100 projects the first projection interface 105 to the local screen projection region of the display interface 202 of the smartwatch 200, and projects the second projection interface 106 into the local screen projection region of the display interface 204 of the in-vehicle infotainment 200-2.

Figure 15:
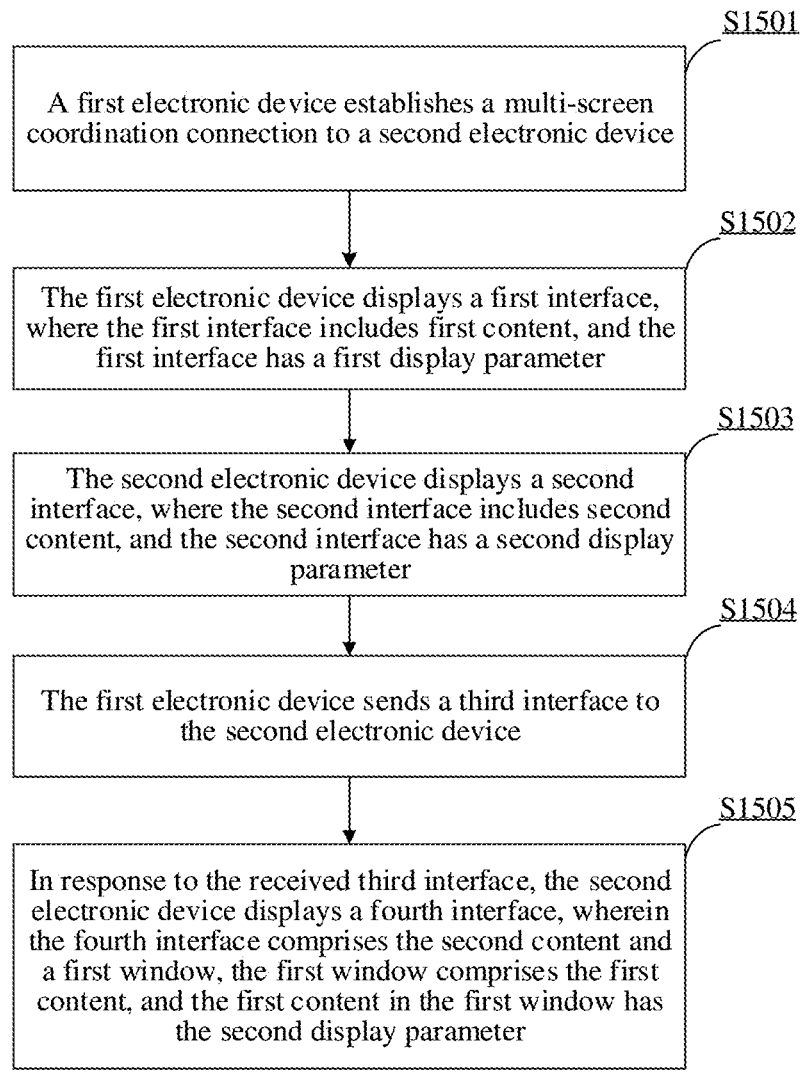
FIG. 15 is a flowchart of a method for performing screen coordination between a first electronic device and a second electronic device according to an embodiment of this application.

FIG. 15 is another method flowchart of screen coordination display in the screen coordination system shown in FIG. 2 according to some other embodiments of this application. Specifically, as shown in FIG. 15, the method includes the following steps.

S1501. A first electronic device establishes a multi-screen coordination connection to a second electronic device.

For a manner of establishing the multi-screen coordination connection, refer to S601 for the process of establishing the multi-screen coordination connection between the mobile phone 100 and the tablet computer 200, for example, the first electronic device may be the mobile phone 100, and the second electronic device may be the tablet computer 200. The mobile phone 100 communicates with the tablet computer 200, and sends a multi-screen collaboration request to the tablet computer 200.

In addition, it may be understood that the second electronic device may alternatively be the smartwatch 200-1 or the in-vehicle infotainment 200-2 in FIG. 3e.

S1502. The first electronic device displays a first interface, where the first interface includes first content, and the first interface has a first display parameter.

For example, as shown in FIG. 3a, the first interface herein may be the display interface 103 of the mobile phone 100, and the display interface 103 includes a title bar, a search bar, a communication column, and the like, that is, the first content. In addition, a font of a character in the display interface 103 is regular script, a background color is pink, and a background pattern is ripple, that is, the first display parameter.

In another example, as shown in FIG. 3e, the first content in the display interface 103 of the mobile phone 100 may also include a contact icon, a contact name, reminder content, a cancel key, a switch to voice key, and the like. In this case, the first display parameter includes parameters for example, a font is regular script, and a background color is pink in the display interface 103.

S1503. The second electronic device displays a second interface, where the second interface includes second content, and the second interface has a second display parameter.

For example, as shown in FIG. 3a, the second interface herein may be the display interface 202 of the tablet computer 200, and the display interface 202 includes: settings, power consumption ranking, and the like, that is, the second content. In addition, a font of a character in the display interface 202 is Song typeface, and a background color is white, that is, the second display parameter.

In another example, as shown in FIG. 3e, the second interface may alternatively be the display interface 202 of the smartwatch 200-1, including date, time, and the like, that is, the second content. In this case, the second display parameter includes that a font of a character is STCaiyun, and a background color is white in the display interface 202 of the smartwatch 200-1. The second interface may alternatively be the display interface 204 of the in-vehicle infotainment 200-2, and the display interface 204 includes: music play information, music play progress, a music play key, and the like, that is, the second content. In this case, the second display parameter includes that a font of a character is Song typeface, and a background color is white in the display interface 204 of the in-vehicle infotainment 200-2.

It may be understood that a sequence from step S1501 to step S1503 is not limited to a sequence shown in the figure, and may be any sequence. For example, the sequence may be a sequence of S1502, S1503, and S1501, or may be a sequence of S1501, S1503, and S1502, or S1501, S1503, and S1502 may be performed simultaneously.

S1504. The first electronic device sends a third interface to the second electronic device.

For example, as shown in FIG. 3a, the third interface may be the projection interface 104 generated by the mobile phone 100. The mobile phone 100 modifies the font style in the projection interface 104 from regular script to Song typeface, modifies the background color to white, modifies the background pattern from a ripple pattern to a ripple-free pattern, that is, modifies them to the second display parameter, and then projects the projection interface 104 to the display interface 202 of the tablet computer 200.

In another example, as shown in FIG. 3e, the third interface may be the first projection interface 105 generated by the mobile phone 100. The mobile phone 100 uses the second display parameter, for example, the font of the character is STCaiyun, and the background color is white. The first projection interface 105 is modified. The third interface may alternatively be the second projection interface 106 generated by the mobile phone 100. The mobile phone 100 uses the second display parameter, for example, the font of the character is Song typeface, the background color is white, and the second projection interface 106 is modified.

S1505. In response to the received third interface, the second electronic device displays a fourth interface, where the fourth interface includes the second content and a first window, the first window includes the first content, and the first content in the first window has the second display parameter.

For example, as shown in FIG. 3a, the fourth interface herein is the display interface 202 of the tablet computer 200, and the first window is the local screen projection region in the display interface 202 of the tablet computer 200. After receiving the projection interface 104 of the mobile phone 100, the tablet computer 200 further displays the projection interface 104, that is, the title bar, the search bar, the communication column, and the like, in addition to the display settings, the power consumption ranking, and the like, in the display interface 202, that is, the first content. In addition, the font of the character in the first content is Song typeface, and the background color is white, and there is no background pattern, that is, the second display parameter.

In another example, as shown in FIG. 3e, the fourth interface herein may be the display interface 202 of the smartwatch 200-1. After receiving the first projection interface 105 of the mobile phone 100, the smartwatch 200-1 uses the second display parameter on the display interface 202, for example, the font of the character is STCaiyun, the background color is white, and the first projection interface 105 that includes the first content is displayed.

The fourth interface herein may alternatively be the display interface 204 of the in-vehicle infotainment 200-2. After receiving the second projection interface 106 of the mobile phone 100, the in-vehicle infotainment 200-2 uses the second display parameter in the display interface 204, for example, the font is Song typeface, the background color is white, and the second projection interface 106 that includes the first content is displayed.

Figure 16:
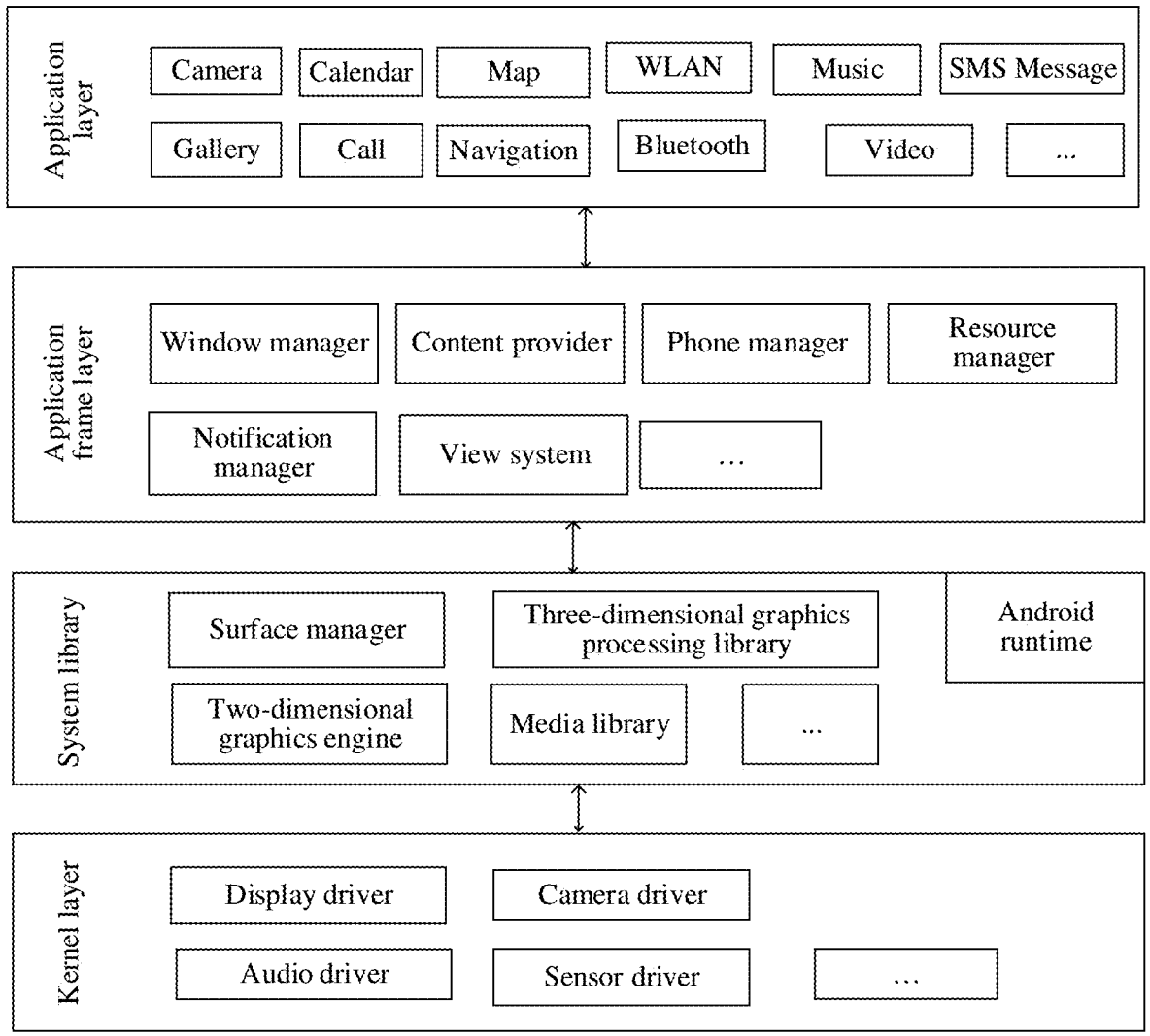
FIG. 16 is a block diagram of a software structure of an electronic device according to an embodiment of this application.

FIG. 16 is a block diagram of a software structure of a mobile phone 100 according to an embodiment of the present invention.

In the layered architecture, software is divided into several layers, and each layer has a clear role and task. The layers communicate with each other by using a software interface. In some embodiments, the Android system is divided into four layers, namely, an application layer, an application framework layer, an Android runtime (Android runtime) and a system library, and a kernel layer from top to bottom.

The application layer may include a series of application packages.

As shown in FIG. 16, the application packages may include applications such as camera, gallery, calendar, call, map, navigation, WLAN, Bluetooth, music, video, and SMS message.

The application framework layer provides an application programming interface (application programming interface, API) and a programming framework for an application at the application layer. The application framework layer includes some predefined functions.

As shown in FIG. 16, the application framework layer may include a window manager, a content provider, a view system, a phone manager, a resource manager, a notification manager, and the like.

The window manager is configured to manage a window program. The window manager may obtain a size of the display screen, determine whether there is a status bar, lock the screen, take a screenshot, and the like.

The content provider is configured to store and obtain data and make the data accessible to an application. The data may include a video, an image, an audio, calls that are made and received, a browsing history and bookmarks, an address book, and the like.

The view system may be the display system service 101 of the mobile phone 100, and is configured to manage and modify a display style of an application of the mobile phone 100. The view system obtains, according to the display style parameter included in the display parameter obtained by the mobile phone 100 from the tablet computer 200, a display function corresponding to the display style parameter, and is configured to configure an application of the mobile phone 100.

The phone manager is configured to provide a communication function of the mobile phone 100, for example, call status management (including connected and hang-up).

The resource manager provides various resources such as a localized character string, an icon, an image, a layout file, and a video file for an application.

In this embodiment of the present invention, the resource manager may be further configured to store an overlay configuration file.

The notification manager enables an application to display notification information in the status bar that may be used to convey a message of a notification type, where the message may disappear automatically after a short stay without user interaction. For example, the notification manager is configured to notify a user of download completion or remind a user of a message. The notification manager may alternatively display a notification in a form of a chart or a scroll bar text in a status bar at the top of the system, for example, a notification of an application run in the background, or may display a notification in a form of a dialog window on the screen. For example, text information is prompted for in the status bar, an announcement is produced, the electronic device vibrates, or the indicator light blinks.

The Android runtime includes a core library and a virtual machine. The Android runtime is responsible for scheduling and management of the Android system.

The core library includes two parts: one is a function that needs to be called by a java language, and the other is a core library of Android.

The application layer and the application framework layer are run in the virtual machine. The virtual machine executes java files of the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, such as: MPEG4, H.264, MP3, AAC, AMR, JPG, PNG, and the like.

The three-dimensional graphics processing library is configured to implement drawing of three-dimensional graphics, image rendering, synthesis, layer processing, and the like.

The 2D graphics engine is a drawing engine for 2D graphics.

The kernel layer is a layer between hardware and software. The kernel layer includes at least a display driver, a camera driver, an audio driver, and a sensor driver.

Through the descriptions of the implementations, a person skilled in the art may understand that, for the purpose of convenient and brief description, only division of the foregoing function modules is used as an example for description. In the practical application, the functions may be allocated to and completed by different function modules according to requirements. That is, an internal structure of the device is divided into different functional modules, to complete all or some of the functions described above.

In the several embodiments provided in this application, it should be understood that the disclosed apparatus and method may be implemented in other manners. For example, the described apparatus embodiment is merely exemplary. For example, the module or the unit division is merely a logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and components displayed as units may be one or more physical units, that is, may be located in one position, or may be distributed on different positions. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, a compact disc, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An inter-device screen coordination method, applied to a screen coordination system comprising a first electronic device and a second electronic device, the method comprising:
    establishing, by the first electronic device, a multi-screen coordination connection to the second electronic device;
    displaying, by the first electronic device, a first interface, wherein the first interface comprises first content, and the first interface has a first display parameter;
    displaying, by the second electronic device, a second interface, wherein the second interface comprises second content, and the second interface has a second display parameter;
    sending, by the first electronic device, information of a third interface to the second electronic device; and
    in response to the received information of the third interface, displaying, by the second electronic device, a fourth interface, wherein the fourth interface comprises the second content and a first window, the first window comprises the first content, and the first content in the first window has the second display parameter; and
    wherein a font size of the first window is greater than a font size of the first interface and is the same as a font size of the second interface of the second electronic device;
    wherein a quantity of characters in the first window is less than a quantity of characters in the first interface; and
    wherein an attribute of at least one control of the first content in the first interface is visible, and the attribute of the at least one control of the first content in the first window is invisible.

2. The method according to claim 1, wherein each of the first display parameter and the second display parameter comprises at least one of a font style, a font size, a font color, an icon color, an icon size, a background color, a background pattern, or a control attribute.

3. The method according to claim 1, wherein the second display parameter comprises a display style identifier, the display style identifier corresponds to a display style of the second interface, and wherein for different values of the display style identifier, at least one of a font style, the font size, a font color, an icon color, an icon size, a background color, a background pattern, or a control attribute of the second interface of the second electronic device is different.

4. The method according to claim 1, further comprising:
    receiving, by the first electronic device, the second display parameter sent by the second electronic device, and generating the third interface based on the received second display parameter, wherein the third interface comprises the first content and has the second display parameter.

5. The method according to claim 4, wherein the first electronic device generates the third interface in the following manner:
    the first electronic device sets a font size in the third interface to be the same as the font size in the second interface of the second electronic device, reduces a quantity of characters in the third interface, and modifies an attribute of at least one control in the third interface to be invisible.

6. The method according to claim 4, wherein the first electronic device generates the third interface in the following manner:
    the first electronic device adjusts a background color in the third interface to be the same as a background color in the second interface of the second electronic device, and adjusts a color of a character and an icon in the third interface to be different from the background color.

7. The method according to claim 1, wherein a background color of the first window is the same as a background color of the second content in the second interface or a fourth interface of the second electronic device, and a color of a character and an icon in the first window is different from the background color.

8. The method according to claim 1, wherein the third interface is an invisible view in the first electronic device or the third interface is generated on a virtual screen of the first electronic device.

9. The method according to claim 1, wherein a size of the third interface is less than a size of a screen of the first electronic device, and the third interface and the first interface are simultaneously displayed on the screen of the first electronic device.

10. The method according to claim 9, wherein the first electronic device further obtains a size of the first window from the second electronic device, and the size of the third interface generated by the first electronic device is the same as the size of the first window.

11. The method according to claim 1, wherein the first electronic device further obtains a size of the first window from the second electronic device; and
    when a size of the third interface generated by the first electronic device is different from the size of the first window, the first electronic device sends the third interface whose size is reduced or enlarged to be the same as the size of the first window to the second electronic device.

12. The method according to claim 1, wherein the screen coordination system further comprises a third electronic device, and the method further comprises:
    further establishing, by the first electronic device, a multi-screen coordination connection to the third electronic device, and displaying, by the third electronic device, a fifth interface, wherein the fifth interface comprises third content, and the fifth interface has a third display parameter;
    sending, by the first electronic device, information of a sixth interface to the third electronic device; and
    in response to the received information of the sixth interface, displaying, by the third electronic device, a seventh interface, wherein the seventh interface comprises the third content and a second window, the second window comprises the first content, and the first content in the second window has the third display parameter.

13. The method according to claim 1, wherein the first interface of the first electronic device comprises at least one of a display desktop, a left slide display interface, a drop-down menu, or an application display interface of the first electronic device.

14. An inter-device screen coordination method, comprising:
establishing, by a first electronic device, a multi-screen coordination connection to a second electronic device;
displaying, by the first electronic device, a first interface, wherein the first interface comprises first content, and the first interface has a first display parameter;
receiving, by the first electronic device, a second display parameter sent by the second electronic device, wherein the second electronic device displays a second interface, the second interface comprises second content, and the second interface has the second display parameter;
generating, by the first electronic device, a third interface according to the second display parameter; and
sending, by the first electronic device, information of the third interface to the second electronic device, wherein the third interface comprises the first content and has the second display parameter; and
wherein a font size of the first interface of the first electronic device is less than a font size of a first window of the second electronic device, and a quantity of characters of the first interface is greater than a quantity of characters of the first window; and
wherein an attribute of at least one control of the first content in the first interface is visible, and the attribute of the at least one control of the first content in the first window is invisible.

15. The method according to claim 14, wherein a background color of the first interface on the first electronic device is different from a background color of the first window in a fourth interface on the second electronic device.

16. A first electronic device, comprising:
at least one processor; and
a non-transitory computer readable storage medium storing instructions that are executable by the at least one processor, the instructions including instructions to:
establish a multi-screen coordination connection to a second electronic device;
display a first interface, wherein the first interface comprises first content, and the first interface has a first display parameter, and wherein the second electronic device displays a second interface, wherein the second interface comprises second content, and the second interface has a second display parameter; and
send information of a third interface to the second electronic device, wherein the second electronic device, in response to the received information of the third interface, displays a fourth interface, wherein the fourth interface comprises the second content and a first window, the first window comprises the first content, and the first content in the first window has the second display parameter; and
wherein a font size of the first window is greater than a font size of the first interface and is the same as a font size of the second interface of the second electronic device;
a quantity of characters in the first window is less than a quantity of characters in the first interface; and
an attribute of at least one control of the first content in the first interface is visible, and the attribute of the at least one control of the first content in the first window is invisible.

17. The first electronic device according to claim 16, wherein each of the first display parameter and the second display parameter comprises at least one of a font style, a font size, a font color, an icon color, an icon size, a background color, a background pattern, or a control attribute.

18. The first electronic device according to claim 16, wherein the second display parameter comprises a display style identifier, the display style identifier corresponds to a display style of the second interface, and wherein for different values of the display style identifier, at least one of a font style, the font size, a font color, an icon color, an icon size, a background color, a background pattern, or a control attribute of the second interface of the second electronic device is different.

19. The first electronic device according to claim 16, wherein the instructions further include instructions to:
receive the second display parameter sent by the second electronic device, and generate the third interface based on the received second display parameter, wherein the third interface comprises the first content and has the second display parameter.

20. The first electronic device according to claim 19, wherein the first electronic device generates the third interface in the following manner:
the first electronic device sets a font size in the third interface to be the same as the font size in the second interface of the second electronic device, reduces a quantity of characters in the third interface, and modifies an attribute of at least one control in the third interface to be invisible.

* * * * *